US011493629B1

(12) United States Patent
Shahrestani

(10) Patent No.: US 11,493,629 B1
(45) Date of Patent: Nov. 8, 2022

(54) CLOUD-BASED MEASUREMENT OF SHRIMP BIOMASS IN AQUACULTURE PONDS

(71) Applicant: MINNOWTECH, Baltimore, MD (US)

(72) Inventor: Suzan Shahrestani, Baltimore, MD (US)

(73) Assignee: Minnowtech LLC, Baltimore, MD (US)

( * ) Notice: Subject to any disclaimer, the term of this patent is extended or adjusted under 35 U.S.C. 154(b) by 31 days.

(21) Appl. No.: 17/325,219

(22) Filed: May 20, 2021

(51) Int. Cl.
| G01S 15/96 | (2006.01) |
| G01S 15/66 | (2006.01) |
| G01S 15/10 | (2006.01) |
| G06Q 40/06 | (2012.01) |
| G06F 21/60 | (2013.01) |
| A01K 79/00 | (2006.01) |
| G06F 21/44 | (2013.01) |

(52) U.S. Cl.
CPC ............ *G01S 15/96* (2013.01); *A01K 79/00* (2013.01); *G01S 15/10* (2013.01); *G01S 15/66* (2013.01); *G06F 21/44* (2013.01); *G06F 21/602* (2013.01); *G06Q 40/06* (2013.01)

(58) Field of Classification Search
CPC .......... G01S 15/96; G01S 15/10; G01S 15/66; A01K 79/00; G06F 21/44; G06F 21/602; G06Q 40/06
See application file for complete search history.

(56) References Cited

U.S. PATENT DOCUMENTS

| 3,540,415 | A | 11/1970 | Bromley |
| 5,320,068 | A | 6/1994 | Redditt |
| 5,655,938 | A | 8/1997 | Huguenin et al. |
| 5,713,303 | A | 2/1998 | Willinsky et al. |
| 6,261,142 | B1 | 7/2001 | Fiotakis |
| 6,317,385 | B1 | 11/2001 | Hedgepeth |
| 6,325,020 | B1 | 12/2001 | Guigne |
| 6,487,545 | B1 | 11/2002 | Wical |
| 6,510,815 | B1 | 1/2003 | Lagardere |
| 6,685,518 | B1 | 2/2004 | Goudey |
| 6,850,173 | B1 | 2/2005 | Steinbrecher |

(Continued)

*Primary Examiner* — Daniel Pihulic
(74) *Attorney, Agent, or Firm* — Juneau & Mitchell; Todd L. Juneau

(57) ABSTRACT

The invention relates to the use of sonar acoustic pulses to provide information about the status and composition of aquaculture farming tanks or ponds. In particular, the invention is directed to processes and systems comprising: a acoustic pulse transducer configured to transmit a acoustic pulse into an aquaculture farming tank or pond, a network of underwater sonar signal receivers; a computer connected to the network of underwater sonar signal receivers, said computer having a processor and memory, said memory having computer programming instructions saved thereon and executable on the processor, said computer programming instructions configured for receiving and comparing a signal difference between the acoustic pulse and the scattered return signal and for using the signal difference to output a signal difference data point related to a calculated shrimp biomass and distribution in the aquaculture farming tank or pond; a computer display connected to the computer and configured to display the signal difference data point related the calculated shrimp biomass and distribution.

25 Claims, 23 Drawing Sheets

(A) Transducer emits an acoustic pulse. (B) Scattered signal is returned following contact with objects in the environment. (C) Signal intensity (amplitude) observed over a temporal scale allows for detection of objects differing from the surrounding medium contained within path of the acoustic pulse.

(56) References Cited

U.S. PATENT DOCUMENTS

| | | |
|---|---|---|
| 7,052,348 B2 | 5/2006 | Price |
| 7,470,086 B2 | 12/2008 | Jennings et al. |
| 7,688,675 B2 * | 3/2010 | Chambers ............... G01S 15/96 367/88 |
| 7,924,165 B2 | 4/2011 | Vinano, Jr. |
| 7,975,651 B2 | 7/2011 | Lutz |
| 8,028,660 B2 | 10/2011 | Troy |
| 8,044,337 B2 | 10/2011 | Duszynski |
| 8,102,071 B2 | 1/2012 | Catlin |
| 8,665,670 B2 | 3/2014 | Gotz |
| 8,881,683 B2 | 11/2014 | Lindgren |
| 8,919,743 B2 | 12/2014 | Osborn |
| 9,524,646 B2 | 12/2016 | Hine |
| 9,541,643 B2 * | 1/2017 | Maguire ............. G01S 15/8902 |
| 9,550,553 B2 | 1/2017 | Wiggins |
| 9,655,347 B2 | 5/2017 | Spencer |
| 9,802,681 B1 | 10/2017 | Hine |
| 10,023,281 B2 | 7/2018 | Wiggins |
| 10,099,759 B1 | 10/2018 | Mehta |
| 10,106,401 B1 | 10/2018 | Rabani |
| 10,123,516 B2 | 11/2018 | Robinson |
| 10,155,569 B2 | 12/2018 | Kyrre |
| 10,372,721 B2 | 8/2019 | Karpistsenko |
| 10,534,404 B2 | 1/2020 | Bhattacharyya |
| 10,578,457 B2 | 3/2020 | Viswanathan |
| 10,599,147 B1 | 3/2020 | Rapoport |
| 10,605,226 B2 | 3/2020 | Sheldon-Coulson |
| 10,716,299 B2 | 7/2020 | Baba |
| 10,816,939 B1 | 10/2020 | Coleman |
| 10,856,520 B1 | 12/2020 | Kozachenok |
| 10,882,591 B2 | 1/2021 | Pieterkosky |
| 2008/0068926 A1 * | 3/2008 | Chambers ............... G01S 15/96 367/87 |
| 2008/0076954 A1 | 3/2008 | Suri et al. |
| 2009/0038204 A1 | 2/2009 | Duszynski |
| 2009/0069181 A1 | 3/2009 | Boulos |
| 2009/0142429 A1 | 6/2009 | Belas |
| 2010/0293831 A1 | 11/2010 | Hreinsson |
| 2011/0176391 A1 | 7/2011 | DeLaCroix |
| 2011/0209382 A1 | 9/2011 | Da Silva Correia et al. |
| 2012/0199079 A1 | 8/2012 | Cheron et al. |
| 2012/0260443 A1 | 10/2012 | Lindgren |
| 2013/0206078 A1 | 8/2013 | Melberg |
| 2014/0261151 A1 | 9/2014 | Ronning |
| 2014/0353221 A1 | 12/2014 | Biley |
| 2015/0156998 A1 | 6/2015 | Terry |
| 2017/0268192 A1 | 9/2017 | Biley |
| 2018/0059028 A1 | 3/2018 | Kremeyer |
| 2019/0225521 A1 | 7/2019 | Heath |
| 2019/0269107 A1 | 9/2019 | Álvarez Gatica |
| 2020/0068858 A1 | 3/2020 | Ayers |
| 2020/0107524 A1 | 4/2020 | Messana |
| 2020/0170227 A1 | 6/2020 | Rishi |
| 2020/0187469 A1 | 6/2020 | Larsen |
| 2020/0253170 A1 | 8/2020 | Simpkinson |
| 2020/0353516 A1 | 11/2020 | Chen |
| 2020/0354022 A1 | 11/2020 | Moffat |
| 2021/0024861 A1 | 1/2021 | He |
| 2021/0107608 A1 | 4/2021 | Spencer |
| 2021/0110157 A1 | 4/2021 | Sinha |
| 2021/0172742 A1 | 6/2021 | Hyland |

* cited by examiner

Figure 1 – (A) Transducer emits an acoustic pulse. (B) Scattered signal is returned following contact with objects in the environment. (C) Signal intensity (amplitude) observed over a temporal scale allows for detection of objects differing from the surrounding medium contained within path of the acoustic pulse.

Figure 2 – Depiction of data generated from multibeam and scanning sonar systems are collected and displayed in (A) two- and (B) three-dimensions. Multibeam systems use multiple transducers to collect data simultaneously while scanning systems collect serial cross-sections with a single transducer. Modified from Zhang et al. 2019.

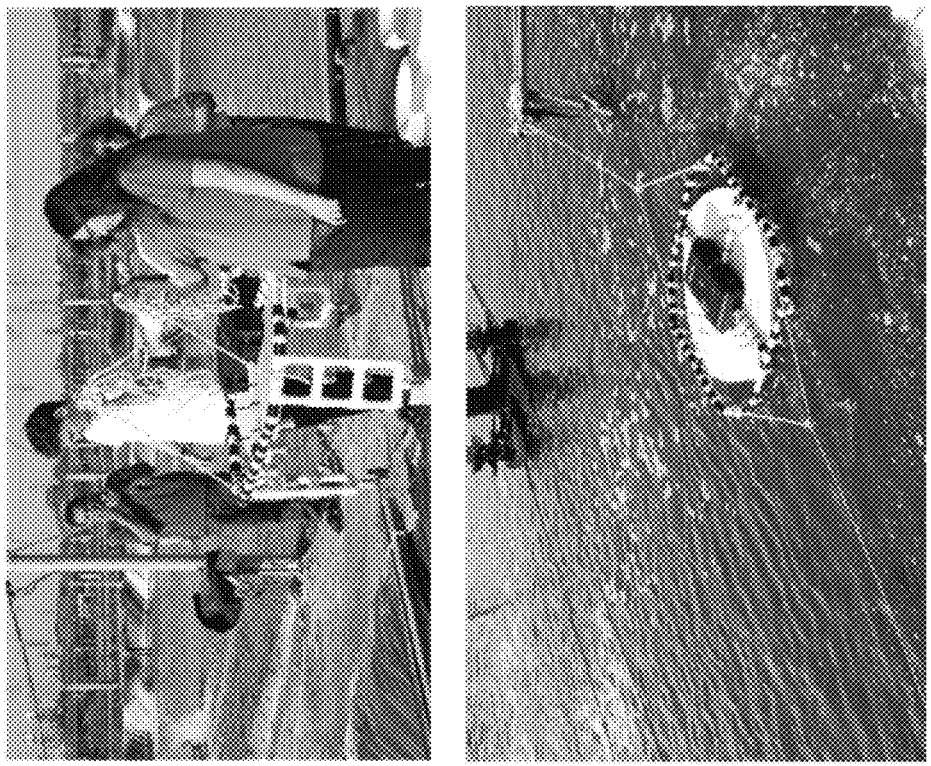
Figure 3 – (Top) Prototype sonar-based device developed as part of the HATCH accelerator program. (Bottom) Deployed prototype device in an intensive-style farm typical of South East Asia.

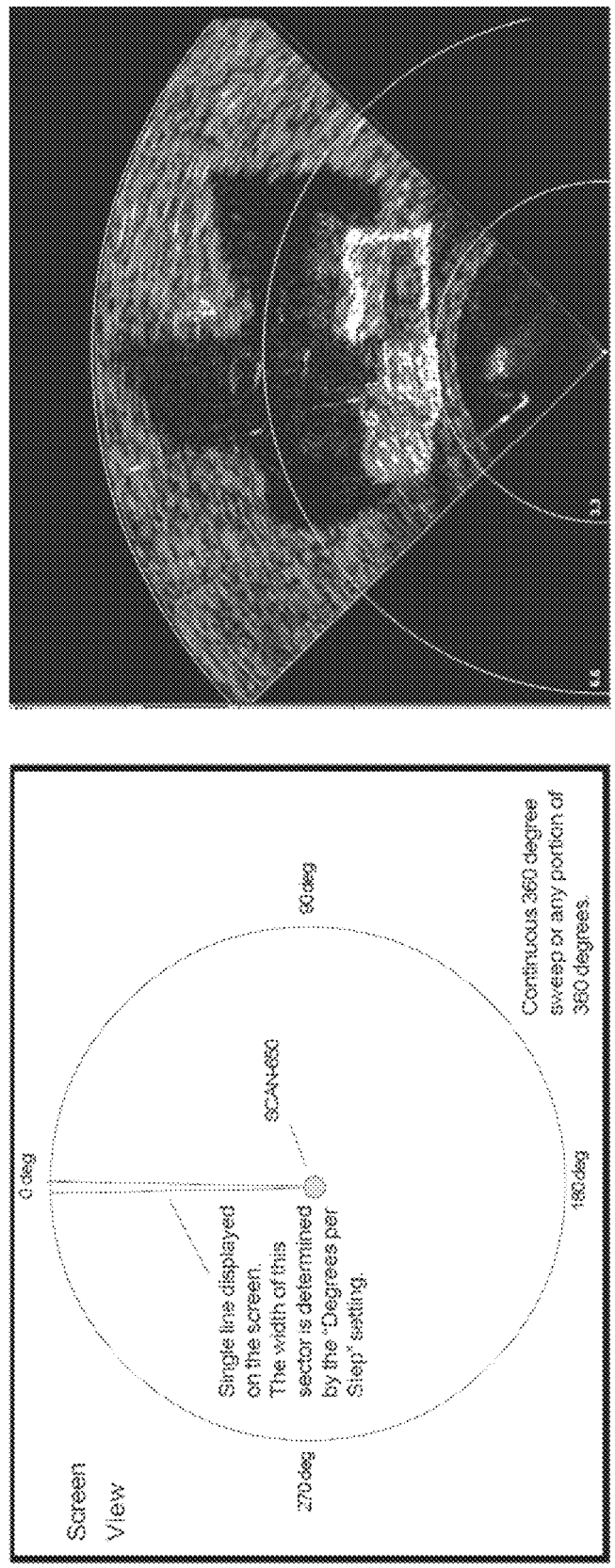
Figure 4 – Operations schematic and sample data collected from a scanning sonar system. (Left) User defined parameters allow for a high degree of control regarding data collection over a field of view. (Right) Example data collected from a JWFishers 650A unit of a sunken pickup truck on a river bottom.

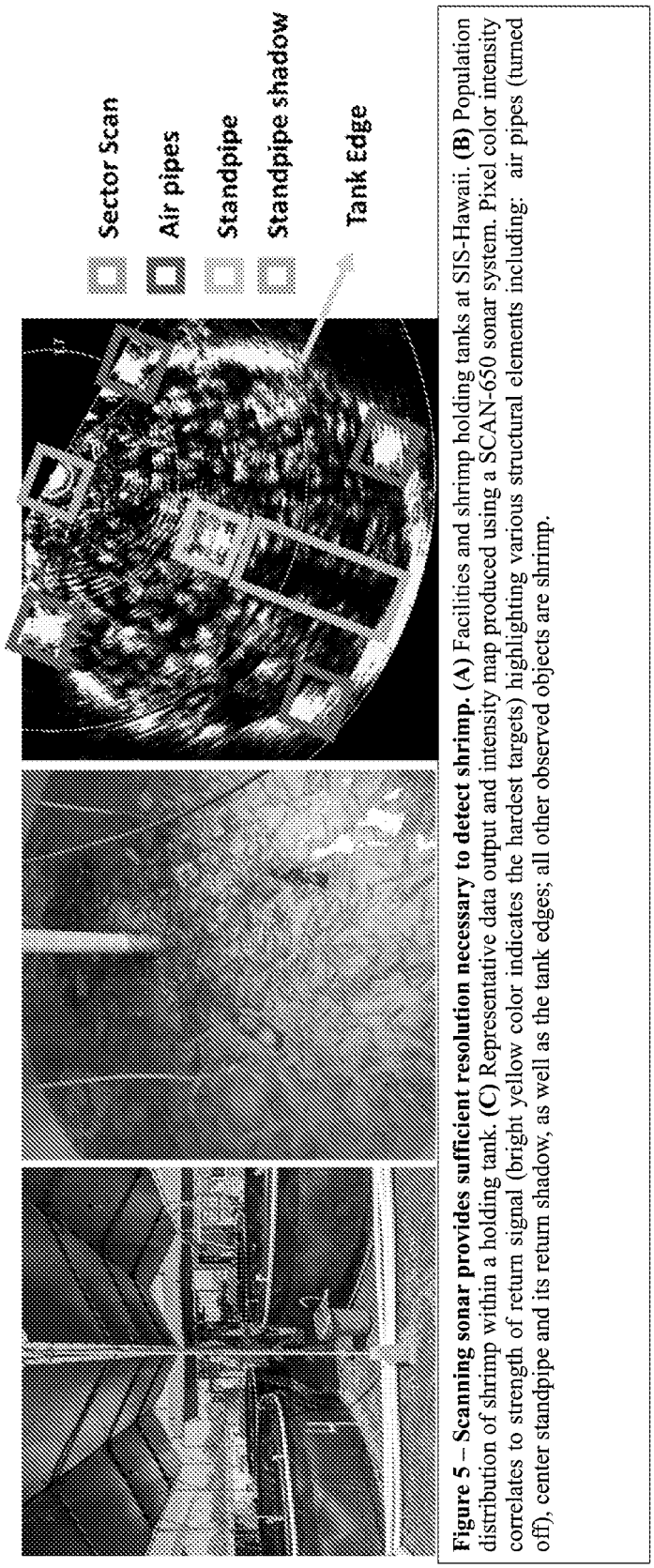

Figure 5 – Scanning sonar provides sufficient resolution necessary to detect shrimp. (A) Facilities and shrimp holding tanks at SIS-Hawaii. (B) Population distribution of shrimp within a holding tank. (C) Representative data output and intensity map produced using a SCAN-650 sonar system. Pixel color intensity correlates to strength of return signal (bright yellow color indicates the hardest targets) highlighting various structural elements including: air pipes (turned off), center standpipe and its return shadow, as well as the tank edges; all other observed objects are shrimp.

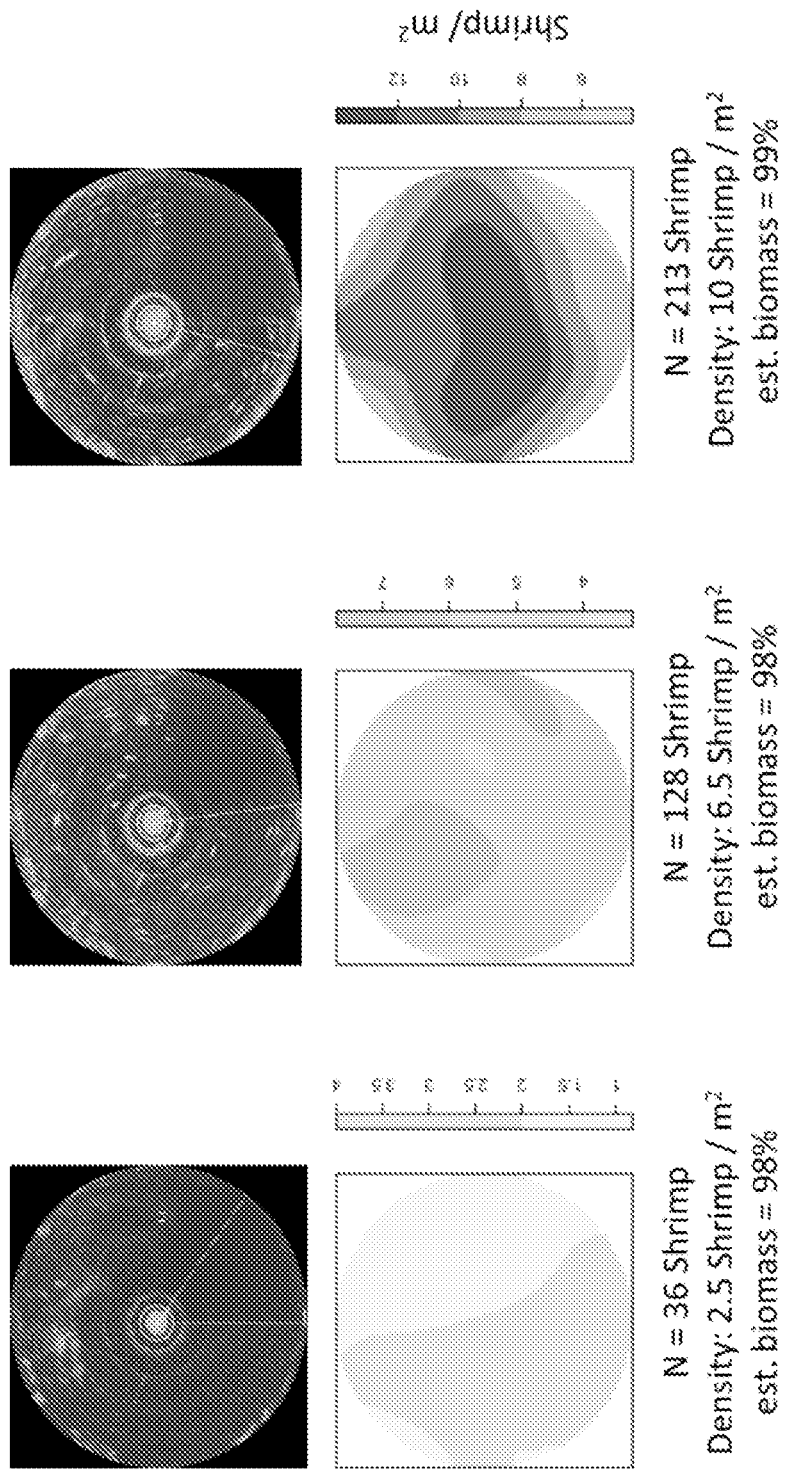
Figure 6 – Collection, analysis, and interpretation of sonar-based image data. (Top) An increasing density in shrimp. (Bottom) Spatial density and distribution of shrimp from observed signal intensity patterns. Population biomass was estimated as a function the summation of known individual metrics (count, size, wight).

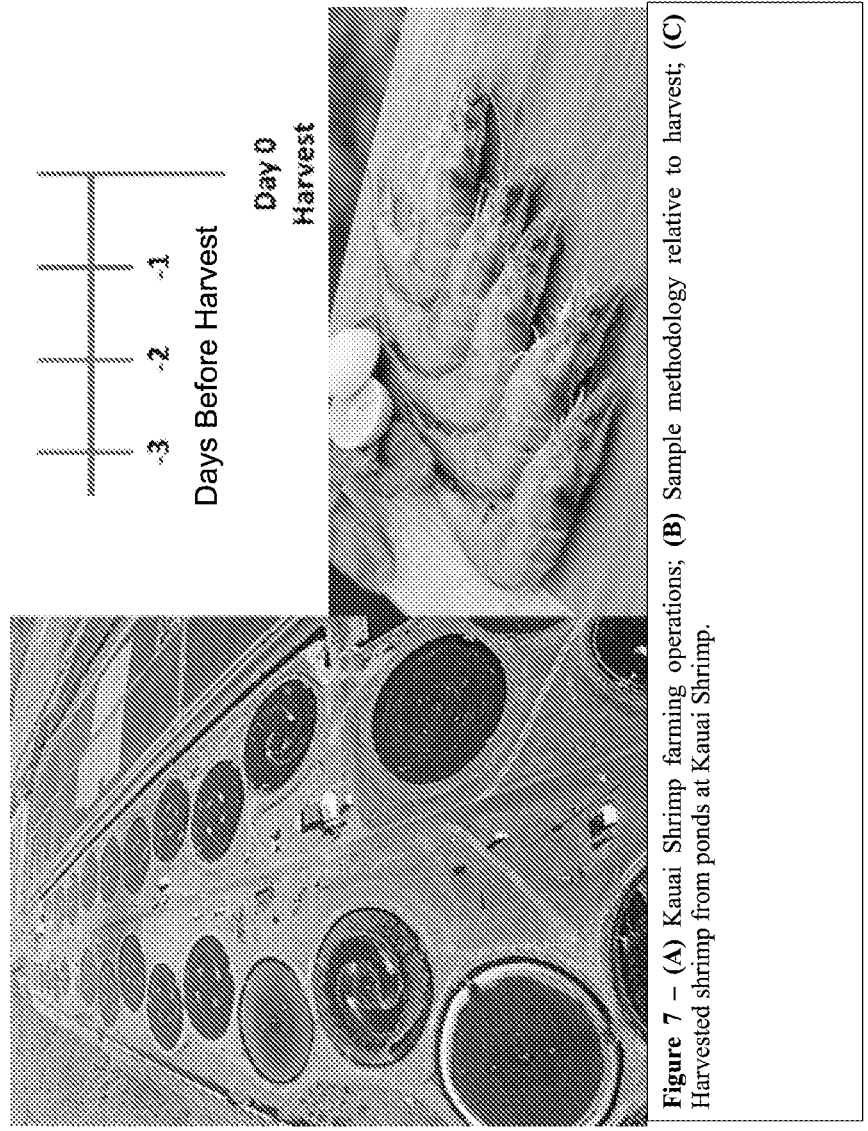
Figure 7 – (A) Kauai Shrimp farming operations; (B) Sample methodology relative to harvest; (C) Harvested shrimp from ponds at Kauai Shrimp.

FIGURE 8

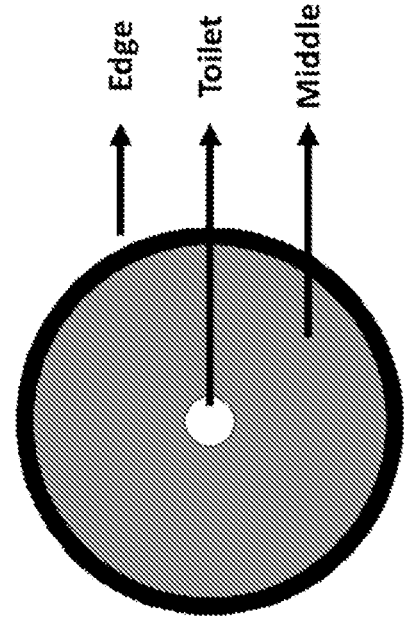

A

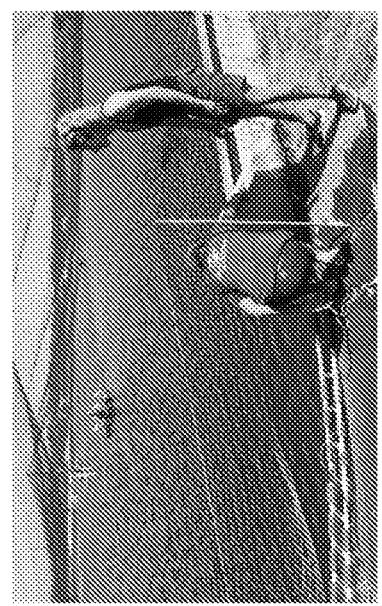

B

C

| Zone | Relative Area (% of pond) | Population Distribution (%) | | | Est. Biomass Accuracy (%) | | |
|---|---|---|---|---|---|---|---|
| | | Proportional Distribution | Non-homogenous Distribution | Spatial Justified Breaking Point | Proportional Distribution | Non-homogenous Distribution | Spatial Justified Breaking Point |
| Toilet | 2% | 2% | 2.5% | 7% | 99% | 71% | 3% |
| Edge | 16% | 16% | 10% | 56% | 99% | 35% | 5% |
| Intermediate | 82% | 82% | 87.5% | 37% | 99% | 94% | 55% |
| Total | 3859 m2 | | | | 9623 lbs | | |

Figure 8 – (A) Dr. Shahrestani and an employee of Kauai Shrimp deploy the SCAN-650 system into a 50m-diameter intestine-style shrimp aquaculture pond. (B) Graphical representation of Kauai ponds layout and definitions of various zones. (C) Statistical modeling of population distribution and extrapolated biomass relative to each zone area.

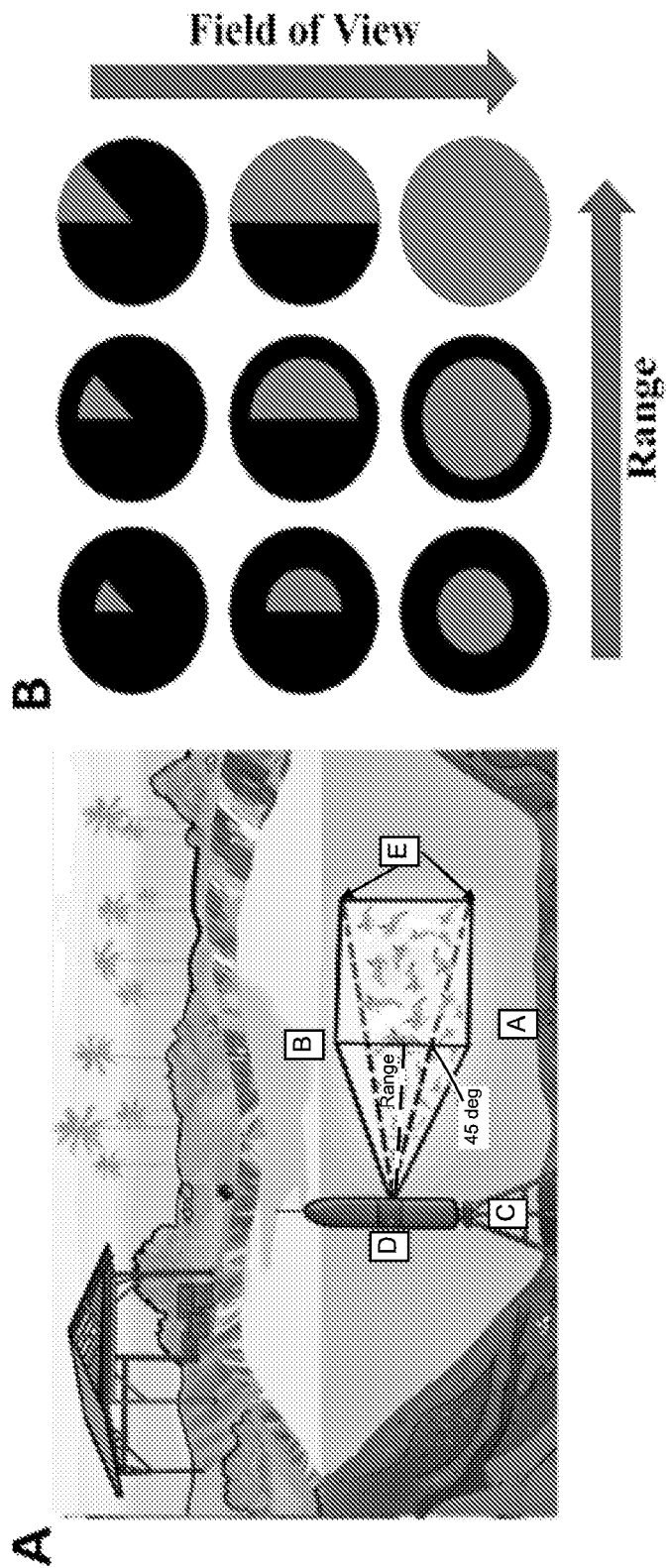
Figure 9 – Spatial coverage is a function of range and field-of-view. (A) Cartoon showing the area sampled by the sonar device within 3D space; (B) Experimental design matrix showing the interplay between range and field-of-view with regards to spatial coverage: black denotes the layout of the pond, blue is the area sampled.

FIGURE 10

| Range | Resolution Images | Resolution (ppi²) | Speed (seconds/frame) | Data Size (Mb/frame) |
|---|---|---|---|---|
| 5m | | 6 | 9 | 2 |
| 10m | | 1.59 | 14 | 3.2 |
| 20m | | 0.4 | 24 | 5.4 |
| 40m | | 0.04 | 44 | 9.8 |

| Scan Angle | Field-of-View | FOV area (m²) | Speed (seconds/frame) | Data Size (Mb/frame) |
|---|---|---|---|---|
| 45° | | 5.57 | 1.125 | 0.25 |
| 60° | | 7.42 | 1.5 | 0.33 |
| 90° | | 11.14 | 2.25 | 0.50 |
| 180° | | 22.27 | 4.5 | 1 |
| 360° | | 44.54 | 9 | 2 |

Figure 10 – Tabulation summary of sampling conditions on optimizing data collection. (Left) Device was held at a 360° scan angle while the range was varied from 5-40m. (Right) Device was held a 5m range and the scan angle was varied from 45-360°. Shaded areas indicate "optimized" settings.

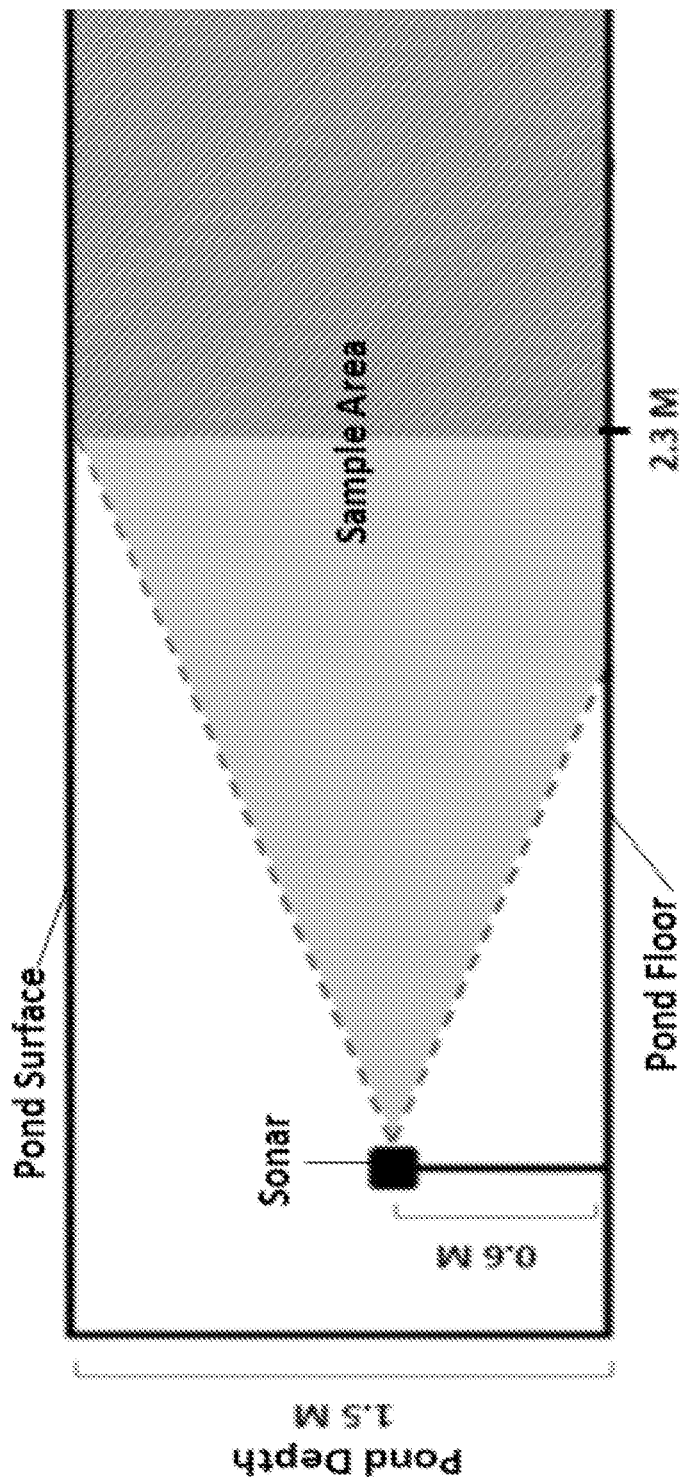
Figure 11 – Placement of the sonar device within the water column. Vertical deployment creates near-field and far-field sampling conditions and the relative distance from the surface or bottom of the pond will dictate the ratio between the two.

FIGURE 12

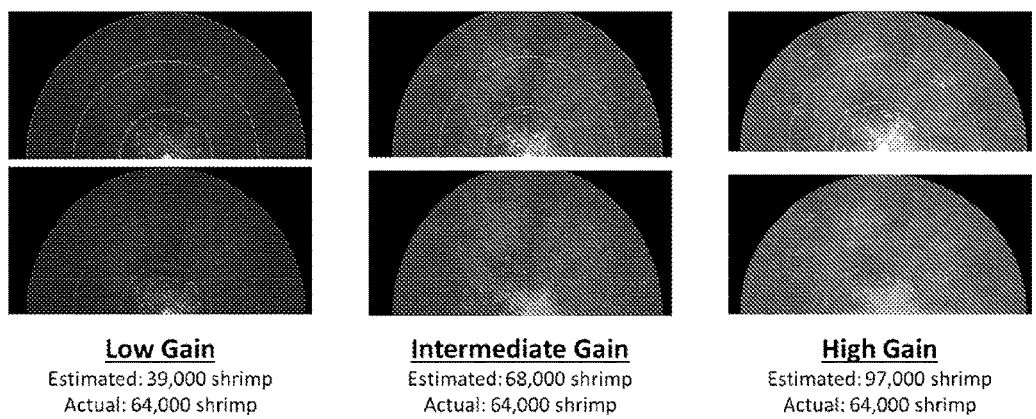

Figure 12 – The effect of overall gain and thresholding on the data output. A single dataset corresponding to an observed biomass was obtained and processed using Low, Intermediate, and High gain. (Left) Low gain settings underestimated population biomass due to a limiting of discernable signal. (Middle) Intermediate gain achieved a 94% accurate estimation of biomass. (Right) High gain settings overestimated biomass due to inappropriately incorporating signal from non-shrimp sources into the calculation of population-level metrics.

Figure 13 – Workflow for handling and processing sonar-based data specific to detection of shrimp.

FIGURE 14

| Harvest | Harvested Biomass (lbs) | Extrapolated Biomass (lbs) | Extrapolated Biomass Accuracy |
|---|---|---|---|
| 1 | 4600 | 5842 | 73% |
| 2 | 10246 | 14242 | 61% |
| 3 | 9403 | 11284 | 80% |
| 4 | 9122 | 11220 | 77% |
| 5 | 7509 | 9762 | 70% |
| 6 | 7412 | 8969 | 79% |
| 7 | 9452 | 6711 | 71% |
| 8 | 9074 | 13067 | 56% |
| 9 | 6435 | 8623 | 66% |
| 10 | 7535 | 9946 | 68% |
| Ave | 8078.8 | 9966.4 | 70.1% |
| SD | 1,709 | 2,617 | 7.7% |

Figure 14 – Comparison of harvested biomass and extrapolated biomass estimates from collected sonar data.

Figure 15 – Modeled biomass accuracy as a function of Spatial Area. The presence of autocorrelation within the dataset reduces the accuracy of calculated population-level metrics at low and high Spatial Areas. Dotted lines indicate Spatial Area range to achieve maximum accuracy.

Figure 16 – Modeled biomass accuracy as a function of time. The presence of autocorrelation within the dataset reduces the accuracy of calculated population-level metrics at limited temporal coverage. Dotted line indicates observed biomass and shaded area indicates 95% confidence intervals associated with increased temporal coverage.

FIGURE 17

| Harvest | Harvested Biomass (lbs) | Refined Estimated Biomass (lbs) | Refined Biomass Accuracy |
|---|---|---|---|
| 1 | 4600 | 4140 | 96% |
| 2 | 10246 | 11475 | 88%* |
| 3 | 9403 | 9043 | 92% |
| 4 | 9122 | 9030 | 99% |
| 5 | 7509 | 7209 | 96% |
| 6 | 7412 | 7338 | 99% |
| 7 | 9452 | 9168 | 97% |
| 8 | 9074 | 9165 | 99% |
| 9 | 6435 | 6242 | 97% |
| 10 | 7535 | 7836 | 96% |
| Ave | 8078.8 | 8064.6 | 96.8% |
| SD | 1,709 | 2,000 | 2.2% |

Figure 17 – Comparison of harvested biomass and refined biomass estimates from collected sonar data.

FIG. 18

Obtaining aquaculture data in an aquaculture facility (i) transmit a series of acoustic pulses with a transducer through the aquaculture facility, wherein the series of acoustic pulses is transmitted over time period t and is transmitted at a scan angle of 15-360°, wherein the aquaculture farming facility has a size of 0.25-100 hectares (ha), wherein the transducer is a scanning transducer and transmits the series of acoustic pulses in cross-sections, wherein the range of the series of acoustic pulses is from 1-50m;

(ii) detect a series of scattered return signals with an underwater sonar receiver, wherein the scattered return signal is detected over the time period t;

(iii) compare the series of acoustic pulses and the series of scattered return signals and calculating a series of signal difference data points;

(iv) transmit the series of signal difference data points by cellular or satellite communication to a cloud server, wherein the series of signal difference data points is processed using a server-side model and/or simulations to generate aquaculture data, wherein the aquaculture data is selected from shrimp biomass, shrimp distribution, shrimp abundance, shrimp size, shrimp growth, shrimp survival, shrimp mortality, shrimp behavior, and shrimp location, wherein the shrimp biomass has > 90% accuracy compared to manual biomass weighing method, wherein the aquaculture data includes the series of signal difference data points transmitted from a single pond, an entire farm of ponds, or an entire region of farms of ponds;

(v) send aquaculture data to one or more subscribers selected from a farmer, a feed supplier, a farm investor, a farm insurer, a shrimp buyer, and a pond monitor, wherein the aquaculture data is used to generate shrimp feed administration data, harvest timing data, feed supplier supply chain data, and/or capital and labor expense data.

FIG. 19

> (vi) generate forecasting data
>
> using a time series plot of aquaculture data, wherein forecasting data includes market pricing data.

FIG. 20

> (vii) deliver forecasting data by subscription to subscribers
>
> selected from a futures trader, a buyer, a shrimp processor, a feed company, a farm investor, and a farm insurer.

FIG. 21

> (vi) generate a list of best farming practices from aquaculture data,
>
> wherein the list of best farming practices is delivered by subscription to subscribers selected from a farmer, an investor, and an insurer.

FIG. 22

(vi) provide an Aquaculture Cloud Server housed in a data center and using a database, relational database, or distributed storage facility, and wherein the aquaculture cloud server includes an encrypted communications protocol to protect communications and storage, and wherein the aquaculture cloud server includes blockchain technology to track identity and authentication information, and wherein aquaculture cloud server includes program instructions to generate reports for subscribers, and wherein the aquaculture cloud server includes a subscription based payment system integrated with the aquaculture cloud server.

FIG. 23

(vi) the aquaculture cloud server is in communication with a local data collection device comprising a smart phone or dedicated mobile device or a local computer, the local data collection device in communication with the underwater sonar receiver, and wherein the local data collection device transmits and receives data from the underwater sonar receiver using Bluetooth, UHF and/or VHF radio, cellular frequencies, satellite frequencies, or a wired connection.

FIG. 24

(vi) the series of signal difference data points is converted to aquaculture data at the aquaculture cloud server, wherein a local data collection device is a repeater to transmit the series of signal difference data points to the aquaculture cloud server, and the aquaculture cloud server has a security module for data security and data integrity, to authenticate the local data collection device using a hardware serial number or device serial number.

FIG. 25

(vi) the series of signal difference data points is converted to aquaculture data at the aquaculture cloud server, wherein a local data collection device is mounted directly on the underwater sonar receiver and transmits aquaculture data directly to the aquaculture cloud server, and wherein the aquaculture cloud server has a security module for data security and data integrity, to authenticate the local data collection device using a hardware serial number or device serial number.

FIG. 26

(vi) the local data collection device collects and transmits GPS or geolocation to the aquaculture cloud server.

FIG. 27

(vi) the aquaculture cloud server has diagnostic programming to monitor the health and functioning of the local data collection device, and wherein the programming includes providing a duty schedule for the underwater sonar receiver for periodic maintenance, and providing an alert system for local data collection device failures to send an alert to the Aquaculture Cloud Server to initiate a repair or replacement work order.

FIG. 28

(vi) the aquaculture cloud server has programming to monitor data and device integrity, where tampering with a local data collection device or tampering with data transmission generates an alert for investigation and repair of the local data collection device.

FIG. 29

(vi) monitoring pond integrity using one or more additional sensors to detect for a toxic chemical, a metal, a biological contaminant, and a contaminant, and the one or more additional sensors report to the Aquaculture Cloud Server, and the aquaculture cloud server provides a report of food source integrity from farm to table, wherein such report provides a value-added feature for farmers and investors, and minimizes liability in the event of loss or injury.

CLOUD-BASED MEASUREMENT OF SHRIMP BIOMASS IN AQUACULTURE PONDS

STATEMENT REGARDING FEDERALLY SPONSORED R&D

This invention was made with government support under (identify the contract) awarded by The U.S. National Science Foundation. The government has certain rights in the invention.

CROSS-REFERENCE TO RELATED APPLICATIONS

N/A

FIELD OF THE INVENTION

The invention relates to methods and devices for obtaining shrimp aquaculture data such as biomass, behavioral data, production data, pond data, regional metadata, and forecasting data in an aquaculture facilities and particularly to using specially programmed sonar equipment to differentiate shrimp signals from noise or other objects.

BACKGROUND OF THE INVENTION

Shrimp farmers must estimate their aquaculture pond biomass to optimize farming practices including proper feed allocation, harvest times, production analytics, and the need to treat when a crop is suffering from disease. However, when farmers take a "best guess" type of approach, they are using incomplete and often inaccurate information to make decisions that results in poor feed to biomass conversion rates, suboptimal harvest timing, as well as a variety of supply chain, traceability, and management issues.

Intensive shrimp aquaculture farming facilities can vary in scope (1 to over 100 ponds) but each individual pond possesses certain typical characteristics: pond size ranges from 0.1-5.0+ hectares (ha)(1 ha=10,000 square meters), bottoms rapidly slope to a 3-4 ft uniform depth, large paddle wheels employed as aeration systems, and drainage for waste being centrally located. Intensive ponds have a typical stocking density of 40-90 PLs/m2 (shrimp/m2), with growout period of 90-120 days, and the entire crop harvested at the same time. A typical intensive pond may operate each pond for 3-4 cycles before they are then emptied, cleaned, and re-filled.

However, current practices consist of measuring population-level information by hand, using a net to capture individual shrimp and extrapolating a few samples to determine the information for an entire pond; including biomass (size+abundance). Shrimp farmers struggle with low profits and high-operational costs due to their outdated methods of cultivation and risk mitigation. Accordingly, there is a need to optimize the gathering of shrimp aquaculture data.

Even under controlled conditions, monitoring of shrimp is not easy. Unlike the cultivation of plants, shrimp are organisms that are constantly in flux (movement, growth, behavior, etc.). In addition, farmed shrimp are relatively small in size (0.1 g at Stocking—35 g at Harvest), cultivated at high densities (90/m2 or 35,000 per 1-acre pond), and exhibit schooling behaviors which creates a lack of uniformity across a defined area. Further complicating the issue, shrimp live in turbid water conditions and are primarily (but not always) concentrated in the bottom-most layer of a body of water known as the benthic zone. The combination of these individual factors results in a complex system that does not lend itself to easy surveillance.

Water clarity is often cited as the major limiting factor in surveillance of aquatic environments. Optical devices are dependent on the availability of light, and as such, are inadequate for shrimp aquaculture due to the high abundance of suspended particles in the turbid water.

Accordingly, there is a need to improve and optimize the gathering of aquaculture data.

SUMMARY

The present invention relates to a non-invasive sonar-based assessment system that accurately estimates shrimp abundance and growth in-situ. In one embodiment, the invention includes one or more underwater sonar sensors that non-invasively capture the species-specific abundance of shrimp in an aquaculture operation. In another embodiment, the invention provides estimates of abundance, size, growth, mortality/survival and/or behavioral abnormalities to the end user by transmitting sonar data from a transducer in a pond to a cloud-server for processing, and this produces actionable data that when displayed reduces feed conversion ratio, provides feed titration, increases profitability by determining harvest time, provides accounting controls and production controls for farmers with multiple sites, maximizing growth conditions by optimizing stocking density, reduces risk factors by providing biosecurity, and provides the ability to take emergency action and perform crop triage.

BRIEF DESCRIPTION OF THE DRAWINGS

FIG. 1 shows (A) Transducer emits an acoustic pulse. (B) Scattered signal is returned following contact with objects in the environment. (C) Signal intensity (amplitude) observed over a temporal scale allows for detection of objects differing from the surrounding medium contained within the path of the acoustic pulse.

FIG. 2 shows a depiction of data generated from multibeam and scanning sonar systems are collected and displayed in (A) two- and (B) three-dimensions. Multibeam systems use multiple transducers to collect data simultaneously while scanning systems collect serial cross-sections with a single transducer. Modified from Zhang et al. 2019. [X]

FIG. 3 is a pair of photographic images of prototype being deployed and after deployment. FIG. 3 shows (Top) a prototype sonar-based device developed as part of the HATCH accelerator program. (Bottom) Deployed prototype device in an intensive-style farm typical of South East Asia.

FIG. 4 is a diagram of a scanner screen and an image of sample data represented on a display connected to the sonar device. FIG. 4 shows an operations schematic and sample data collected from a scanning sonar system. (Left) User defined parameters allow for a high degree of control regarding data collection over a field of view. (Right) Example data collected from a JWFishers 650A unit of a sunken pickup truck on a river bottom.

FIG. 5 is a four-part set of images illustrating an aquaculture facility, a farming tank or pond in operation, a sonar scan image, and a colorimetric key for identification of features in the sonar scan image. FIG. 5 shows a scanning sonar provides sufficient resolution necessary to detect shrimp. (A) Facilities and shrimp holding tanks at SIS-Hawaii. (B) Population distribution of shrimp within a holding tank. (C) Representative data output and intensity map produced using a SCAN-650 sonar system. Pixel color intensity correlates to strength of return signal (bright yellow color indicates the hardest targets) highlighting various structural elements including: air pipes (turned off), center standpipe and its return shadow, as well as the tank edges; all other observed objects are shrimp.

FIG. 6 is a set of six images in two rows with the top row having three sonar scan images and the bottom row having a graphic representation of shrimp density. FIG. 6 shows a collection, analysis, and interpretation of sonar-based image data. (Top) An increasing density in shrimp. (Bottom) Spatial density and distribution of shrimp from observed signal intensity patterns. Population biomass was estimated as a function the summation of known individual metrics (count, size, weight).

FIG. 7 is a set of three images with an aerial photo of an aquaculture facility having up to 25 circular ponds, a close up photo of shrimp, and a graph of days to harvest. FIG. 7 shows (A) Kauai Shrimp farming operations; (B) Sample methodology relative to harvest; (C) Harvested shrimp from ponds at Kauai Shrimp.

FIG. 8 is a set of three images with a photograph of personnel next to a shrimp farming pond, a top view of a single circular pond showing various zones, and a graph of zone versus distribution and accuracy. FIG. 8 shows a (A) Dr. Shahrestani and an employee of Kauai Shrimp deploy the SCAN-650 system into a 50 m-diameter intestine-style shrimp aquaculture pond. (B) Graphical representation of Kauai ponds layout and definitions of various zones. (C) Statistical modeling of population distribution and extrapolated biomass relative to each zone area.

FIG. 9 is a set of two images with a cross-sectional illustration of a sonar device placed in a shrimp pond, and a graph of range versus field of view (FOV). FIG. 9 shows a spatial coverage is a function of range and field-of-view. (A) Cartoon showing the area sampled by the sonar device within 3D space; (B) Experimental design matrix showing the interplay between range and field-of-view with regards to spatial coverage: black denotes the layout of the pond, blue is the area sampled.

FIG. 10 is a set of two graphs showing range against parameters and scan angle against parameters. FIG. 10 shows a tabulation summary of sampling conditions on optimizing data collection. (Left) Device was held at a 360° scan angle while the range was varied from 5-40 m. (Right) Device was held a 5 m range and the scan angle was varied from 45-360°. Shaded areas indicate "optimized" settings.

FIG. 11 is a side-view (cross-section) illustration of a sonar device mounted on the floor of an aquaculture facility pond. FIG. 11 shows a placement of the sonar device within the water column. Vertical deployment creates near-field and far-field sampling conditions and the relative distance from the surface or bottom of the pond will dictate the ratio between the two.

FIG. 12 is a set of six images in three columns with the first column at low gain, the middle column at intermediate gain, and the last column at high gain. FIG. 12 shows the effect of overall gain and thresholding on the data output. A single dataset corresponding to an observed biomass was obtained and processed using Low, Intermediate, and High gain. (Left) Low gain settings underestimated population biomass due to a limiting of discernable signal. (Middle) Intermediate gain achieved a 94% accurate estimation of biomass. (Right) High gain settings overestimated biomass due to inappropriately incorporating the signal from non-shrimp sources into the calculation of population-level metrics.

FIG. 13 shows a workflow for handling and processing sonar-based data specific to detection of shrimp.

FIG. 14 is a table of harvest number with harvested biomass compared against biomass from sonar data and accuracy. FIG. 14 shows a comparison of harvested biomass and extrapolated biomass estimates from collected sonar data.

FIG. 15 shows a modeled biomass accuracy as a function of Spatial Area. The presence of autocorrelation within the dataset reduces the accuracy of calculated population-level metrics at low and high Spatial Areas. Dotted lines indicate Spatial Area range to achieve maximum accuracy.

FIG. 16 shows a modeled biomass accuracy as a function of time. The presence of autocorrelation within the dataset reduces the accuracy of calculated population-level metrics at limited temporal coverage. Dotted line indicates observed biomass and shaded area indicates 95% confidence intervals associated with increased temporal coverage.

FIG. 17 is a table of harvest number with harvested biomass versus estimated sonar data using the invention and the accuracy percentages. FIG. 17 shows a comparison of harvested biomass and refined biomass estimates from collected sonar data.

FIG. 18 is a flowchart illustrating in a non-limiting embodiment a method of obtaining aquaculture data having five (5) main steps.

FIG. 19 is a continuation of a flowchart illustrating in a non-limiting embodiment the addition of step (vi) generating forecast data.

FIG. 20 is a flowchart illustrating in a non-limiting embodiment the addition of step (vi) delivering forecast data.

FIG. 21 is a flowchart illustrating in a non-limiting embodiment the addition of step (vi) generating best farming practices.

FIG. 22 is a flowchart illustrating in a non-limiting embodiment the addition of step (vi) providing a secure aquaculture cloud server for paid subscribers.

FIG. 23 is a flowchart illustrating in a non-limiting embodiment the addition of step (vi) providing a local comm device in communication with the sonar.

FIG. 24 is a flowchart illustrating in a non-limiting embodiment the addition of step (vi) providing a local comm device as a repeater connected to the sonar.

FIG. 25 is a flowchart illustrating in a non-limiting embodiment the addition of step (vi) providing a local comm device attached to the sonar.

FIG. 26 is a flowchart illustrating in a non-limiting embodiment the addition of step (vi) providing GPS or geolocation.

FIG. 27 is a flowchart illustrating in a non-limiting embodiment the addition of step (vi) diagnostic and alert systems.

FIG. 28 is a flowchart illustrating in a non-limiting embodiment the addition of step (vi) providing anti-tampering alerts.

FIG. 29 is a flowchart illustrating in a non-limiting embodiment the addition of step (vi) providing additional sensors to ensure food source integrity and security.

DETAILED DESCRIPTION OF THE PREFERRED EMBODIMENTS

Figure 1:
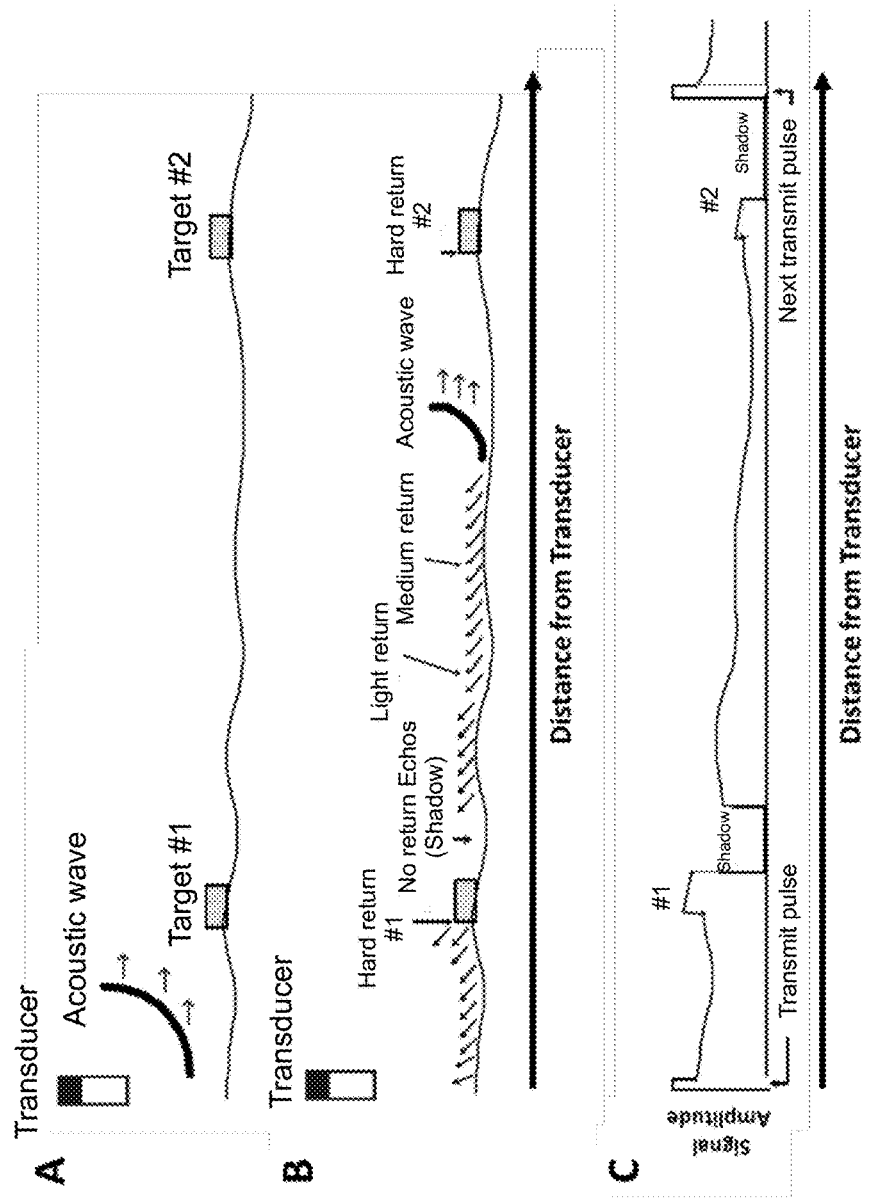
FIG. 1 is a plan view diagram of sonar device in an aquaculture facility and shows a non-limiting illustration of an acoustic signal within an aquaculture facility (pond).
Figure 2:
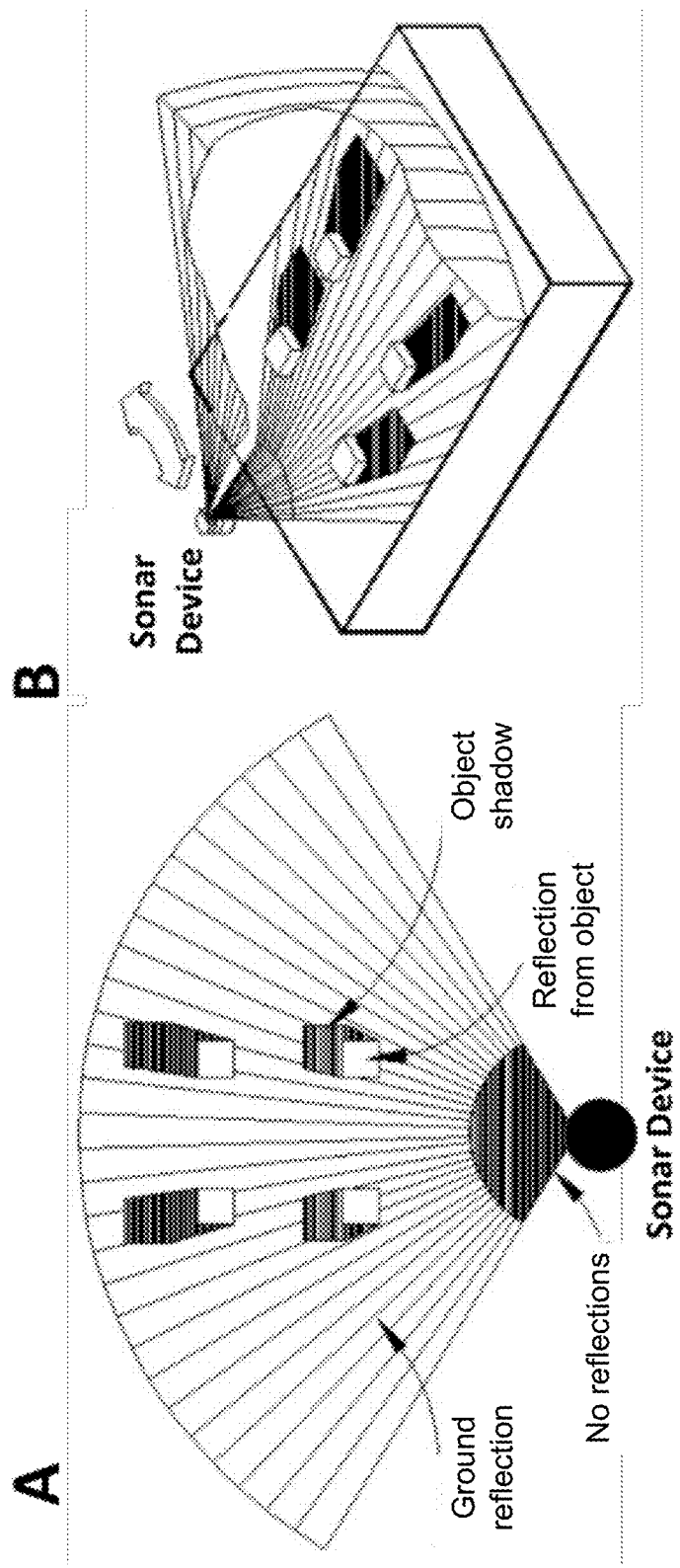
FIG. 2 is a top view and a perspective view of a sonar device in an aquaculture facility and shows a non-limiting illustration of an acoustic signal within a aquaculture facility.

In a preferred embodiment, the invention provides a method for obtaining aquaculture data in an aquaculture facility, comprising: (i) transmitting a series of acoustic pulses with a transducer through the aquaculture facility, wherein the series of acoustic pulses is transmitted over time period t and is transmitted at a scan angle of 15-360°, wherein the aquaculture farming facility has a size of 0.25-100 hectares (ha), wherein the transducer is a scanning transducer and transmits the series of acoustic pulses in cross-sections, wherein the range of the series of acoustic pulses is from 1-50 m; (ii) detecting a series of scattered return signals with an underwater sonar receiver, wherein the scattered return signal is detected over the time period t; (iii) comparing the series of acoustic pulses and the series of scattered return signals and calculating a series of signal difference data points; (iv) transmitting the series of signal difference data points by cellular or satellite communication to a cloud server, wherein the series of signal difference data points is processed using a server-side model and/or simulations to generate aquaculture data, wherein the aquaculture data is selected from shrimp biomass, shrimp distribution, shrimp abundance, shrimp size, shrimp growth, shrimp survival, shrimp mortality, shrimp behavior, and shrimp location, wherein the shrimp biomass has >90% accuracy compared to manual biomass weighing method, wherein the aquaculture data includes the series of signal difference data points transmitted from a single pond, an entire farm of ponds, or an entire region of farms of ponds; (v) sending aquaculture data to one or more subscribers selected from a farmer, a feed supplier, a farm investor, a farm insurer, a shrimp buyer, and a pond monitor, wherein the aquaculture data is used to generate shrimp feed administration data, harvest timing data, feed supplier supply chain data, and/or capital and labor expense data.

Any of the methods herein may also provide a preferred embodiment wherein forecasting data is generated using a time series plot of aquaculture data, wherein forecasting data includes market pricing data.

Any of the methods herein may also provide a preferred embodiment wherein the forecasting data is delivered by subscription to subscribers selected from a futures trader, a buyer, a shrimp processor, a feed company, a farm investor, and a farm insurer.

Any of the methods herein may also provide a preferred embodiment comprising the step of generating a list of best farming practices from aquaculture data, wherein the list of best farming practices is delivered by subscription to subscribers selected from a farmer, an investor, and an insurer.

Any of the methods herein may also provide a preferred embodiment wherein the Aquaculture Cloud Server is housed in a data center and uses a database, relational database, or distributed storage facility, and wherein the aquaculture cloud server includes an encrypted communications protocol to protect communications and storage, and wherein the aquaculture cloud server includes blockchain technology to track identity and authentication information, and wherein aquaculture cloud server includes program instructions to generate reports for subscribers, and wherein the aquaculture cloud server includes a subscription based payment system integrated with the aquaculture cloud server.

Any of the methods herein may also provide a preferred embodiment wherein the aquaculture cloud server is in communication with a local data collection device comprising a smart phone or dedicated mobile device or a local computer, the local data collection device in communication with the underwater sonar receiver, and wherein the local data collection device transmits and receives data from the underwater sonar receiver using Bluetooth, UHF and/or VHF radio, cellular frequencies, satellite frequencies, or a wired connection.

Any of the methods herein may also provide a preferred embodiment wherein the series of signal difference data points is converted to aquaculture data at the aquaculture cloud server, wherein a local data collection device is a repeater to transmit the series of signal difference data points to the aquaculture cloud server, and wherein the aquaculture cloud server has a security module for data security and data integrity, to authenticate the local data collection device using a hardware serial number or device serial number.

Any of the methods herein may also provide a preferred embodiment wherein the series of signal difference data points is converted to aquaculture data at the aquaculture cloud server, wherein a local data collection device is mounted directly on the underwater sonar receiver and transmits aquaculture data directly to the aquaculture cloud server, and wherein the aquaculture cloud server has a security module for data security and data integrity, to authenticate the local data collection device using a hardware serial number or device serial number.

Any of the methods herein may also provide a preferred embodiment wherein the local data collection device collects and transmits GPS or geolocation to the aquaculture cloud server.

Any of the methods herein may also provide a preferred embodiment wherein the aquaculture cloud server has diagnostic programming to monitor the health and functioning of the local data collection device, and wherein the programming includes providing a duty schedule for the underwater sonar receiver for periodic maintenance, and providing an alert system for local data collection device failures to send an alert to the Aquaculture Cloud Server to initiate a repair or replacement work order.

Any of the methods herein may also provide a preferred embodiment wherein the aquaculture cloud server has programming to monitor data and device integrity, where tampering with a local data collection device or tampering with data transmission generates an alert for investigation and repair of the local data collection device.

Any of the methods herein may also provide a preferred embodiment wherein pond integrity is monitored using one or more additional sensors to detect for a toxic chemical, a metal, a biological contaminant, and a contaminant, and wherein the one or more additional sensors report to the Aquaculture Cloud Server, and wherein the aquaculture cloud server provides a report of food source integrity from farm to table, wherein such report provides a value-added feature for farmers and investors, and minimizes liability in the event of loss or injury.

Any of the methods herein may also provide a preferred embodiment wherein the transducer comprises a multibeam system having multiple transducers, each of said multiple transducers transmitting multiplexed acoustic pulses simultaneously, and wherein the networked underwater sonar receivers in said multibeam system configured to receive said multiplexed acoustic pulses.

In another preferred embodiment, the invention provides a a process for obtaining aquaculture data in an aquaculture facility, comprising: transmitting an acoustic pulse with a transducer through the aquaculture farming tank or pond; detecting a scattered return signal in one or more underwater sonar receivers; comparing a signal difference between the acoustic pulse and the scattered return signal and inputting said signal difference into a computer having a processor and memory, said memory having computer program instructions saved thereon and executable on the processor, said program instructions configured to receive the signal difference and calculate a signal difference data point related to a calculated shrimp biomass and distribution in the aquaculture farming tank or pond; and outputting to a display the signal difference data point related to the calculated shrimp biomass and distribution.

Any of the processes herein may also provide a preferred embodiment wherein the aquaculture data comprises biomass data, behavioral data, production data, pond data, regional metadata, and forecasting data.

Any of the embodiments herein may also provide processes wherein the acoustic pulse is transmitted over a period of time t, wherein the scattered return signal is detected over the period of time t, wherein the signal difference is inputted over the period of time t, wherein the signal difference over time period t is saved to memory as a series of signal difference data points, wherein each of the series of signal difference data points are related to the calculated shrimp biomass and distribution; and wherein the series of signal data points or transformed data are output to a local display (device itself), semi-local (device connected to a computer), and/or remote (to the cloud for processing/storage).

In any of the embodiments herein, the processes also comprise wherein the signal difference data point is selected from the group consisting of a shrimp abundance data point, a shrimp size data point, a shrimp growth data point, a shrimp behavior data point, and a location within the aquaculture farming tank or pond data point.

In any of the embodiments herein, the processes also comprise wherein the transducer is a scanning transducer and transmits acoustic pulses in a series of cross-sections.

In any of the embodiments herein, the processes also comprise wherein the transducer comprises a multibeam system having multiple transducers, each of said multiple transducers transmitting multiplexed acoustic pulses simultaneously, and wherein the networked underwater sonar receivers in said multibeam system configured to receive said multiplexed acoustic pulses.

In any of the embodiments herein, the processes also comprise wherein the display comprises an intensity map having pixel color intensity correlate to strength of the scattered return signal, and wherein a structural element in said aquaculture farming tank or pond is represented differently than shrimp, said structural element selected from an air pipe, a center standpipe, or a tank edge.

In any of the embodiments herein, the processes also comprise wherein the aquaculture farming facility has a size selected from the group consisting of 0.25 hectares (ha), 0.5 ha, 0.25-1.0 ha, 1 ha, 0.5-3.0 ha, 1.0-3.0 ha, >3.0 ha, 3.0-20 ha, 20-100 ha.

Any of the embodiments provided herein may include an aquaculture facility having a diameter or having a length in at least one dimension selected from the group consisting of 3 meters, 5 meters, 3-10 meters, 5-20 meters, 10-30 meters, 20-40 meters, less than 50 meters, 40-80 meters, 40-100 meters, 100 meters, and >100 meters.

In any of the embodiments herein, the processes also comprise wherein the acoustic pulse is transmitted at a scan angle selected from 15-360°, 15-60°, 30-90°, 45°, 30-180°, 60-270°, 45-360°, 180°, and 270°.

Any of the embodiments herein may also include a range from 5-10 m, 5-20 m, 5-40 m, 5-50 m, 5-250 m, 20-100 m, 20-250 m, and >50 m.

Any of the embodiments herein may include processes wherein the process achieves an estimation of biomass selected from the group consisting of: >70% accuracy, >80% accuracy, 70-90% accuracy, 70-94% accuracy, 80-94% accuracy, and >90% accuracy.

In another preferred embodiment, the invention provides a system comprising: a acoustic pulse transducer configured to transmit a acoustic pulse into an aquaculture farming tank or pond, one or more underwater sonar signal receivers; a computer connected to the network of underwater sonar signal receivers, said computer having a processor and memory, said memory having computer programming instructions saved thereon and executable on the processor, said computer programming instructions configured for receiving and comparing a signal difference between the acoustic pulse and the scattered return signal and for using the signal difference to output a signal difference data point related to a calculated shrimp biomass and distribution in the aquaculture farming tank or pond; a computer display connected to the computer and configured to display the signal difference data point related the calculated shrimp biomass and distribution.

In any of the embodiments herein, the systems also comprise wherein the acoustic pulse is transmitted over a period of time t, wherein the scattered return signal is detected over the period of time t, wherein the signal difference is inputted over the period of time t, wherein the signal difference over time period t is saved to memory as a series of signal difference data points, wherein each of the series of signal difference data points are related to the calculated shrimp biomass and distribution; and wherein the series of signal data points are output to the display.

In any of the embodiments herein, the systems also comprise wherein the signal difference data point is selected from the group consisting of a shrimp abundance data point, a shrimp size data point, a shrimp growth data point, a shrimp behavior data point, and a location within the aquaculture farming tank or pond data point.

In any of the embodiments herein, the systems also comprise wherein the transducer is a scanning transducer and transmits acoustic pulses in a series of cross-sections.

In any of the embodiments herein, the systems also comprise wherein the transducer comprises a multibeam system having multiple transducers, each of said multiple transducers transmitting multiplexed acoustic pulses simultaneously, and wherein the networked underwater sonar receivers in said multibeam system configured to receive said multiplexed acoustic pulses.

In any of the embodiments herein, the systems also comprise wherein the display comprises an intensity map having pixel color intensity correlate to strength of the scattered return signal, and wherein a structural element in said aquaculture farming tank or pond is represented differently than shrimp, said structural element selected from an air pipe, a center standpipe, or a tank edge.

Any of the systems herein may also include wherein the aquaculture farming facility has a size selected from the group consisting of 0.25 hectares (ha), 0.5 ha, 0.25-1.0 ha, 1 ha, 0.5-3.0 ha, 1.0-3.0 ha, >3.0 ha, 3.0-20 ha, 20-100 ha.

Any of the systems herein may also include an aquaculture facility having a diameter or having a length in at least one dimension selected from the group consisting of 3 meters, 5 meters, 3-10 meters, 5-20 meters, 10-30 meters, 20-40 meters, less than 50 meters, 40-80 meters, 40-100 meters, 100 meters, and >100 meters.

Any of the systems herein may also include wherein the acoustic pulse is transmitted at a scan angle selected from 15-360°, 15-60°, 30-90°, 45°, 30-180°, 60-270°, 45-360°, 180°, and 270°.

Any of the systems herein may also include a range from 5-10 m, 5-20 m, 5-40 m, 5-50 m, 5-250 m, 20-100 m, 20-250 m, and >50 m.

In any of the embodiments herein, the systems also comprise wherein the process achieves an estimation of biomass selected from the group consisting of: >70% accuracy, >80% accuracy, 70-90% accuracy, 70-94% accuracy, 80-94% accuracy, and >90% accuracy.

In another embodiment of the invention, there is provided a method of using an aquaculture cloud server for aquaculture farming, comprising: transmitting aquaculture data by cellular or satellite communication to a cloud server, wherein aquaculture farming data is processed using a server-side model and/or simulations to generate refined aquaculture data, wherein the aquaculture farming data includes shrimp behavior data uploaded and from a single pond, an entire farm of ponds, or an entire region of farms of ponds, wherein the refined aquaculture data includes >90% accurate biomass data; sending refined aquaculture data to one or more subscribers selected from a farmer, a feed supplier, a farm investor, a farm insurer, a shrimp buyer, and a pond monitor, wherein the refined aquaculture data is used to generate shrimp feed administration data, harvest timing data, feed supplier supply chain data, and capital and labor expense data.

Any of the aquaculture cloud server methods herein may include wherein forecasting data is generated using a time series plot of refined aquaculture data, wherein forecasting data includes market pricing data.

Any of the aquaculture cloud server methods herein may include wherein the forecasting data is delivered by subscription to subscribers selected from a futures trader, a buyer, a shrimp processor, a feed company, a farm investor, and a farm insurer.

Any of the aquaculture cloud server methods herein may comprise the step of generating a list of best farming practices from aquaculture refined data, wherein the list of best farming practices is delivered by subscription to subscribers selected from a farmer, an investor, and an insurer.

Any of the aquaculture cloud server methods herein may include wherein the Aquaculture Cloud Server is housed in a data center and uses a database, relational database, or distributed storage facility, and wherein the aquaculture cloud server includes an encrypted communications protocol to protect communications and storage, and wherein the aquaculture cloud server includes blockchain technology to track identity and authentication information, and wherein aquaculture cloud server includes program instructions to generate reports for subscribers, and wherein the aquaculture cloud server includes a subscription based payment system integrated with the aquaculture cloud server.

Any of the aquaculture cloud server methods herein may include wherein the aquaculture cloud server is in communication with a local data collection device comprising a smart phone or dedicated mobile device or a local computer in communication with a sonar device operating in an aquaculture pond, and wherein the data collection device transmits and receives data from the sonar device using Bluetooth, UHF and/or VHF radio, cellular frequencies, satellite frequencies, or a wired connection.

Any of the aquaculture cloud server methods herein may include wherein aquaculture farming data is converted to aquaculture refined data at the aquaculture cloud server, wherein a local data collection device is a repeater to transmit aquaculture farming data to the aquaculture cloud server, and wherein the aquaculture cloud server has a security module for data security and data integrity, to authenticate a local data collection device using a hardware serial number or device serial number.

Any of the aquaculture cloud server methods herein may include wherein aquaculture farming data is converted to aquaculture refined data at the aquaculture cloud server, wherein a local data collection device is mounted on the sonar device and transmits aquaculture farming data directly to the aquaculture cloud server, and wherein the aquaculture cloud server has a security module for data security and data integrity, to authenticate the local data collection device using a hardware serial number or device serial number.

Any of the aquaculture cloud server methods herein may include wherein the local data collection device collects and transmits GPS or geolocation to the aquaculture cloud server.

Any of the aquaculture cloud server methods herein may include wherein the aquaculture cloud server has diagnostic programming to monitor the health and functioning of the local data collection device, and wherein the programming includes providing a duty schedule for the sonar device for periodic maintenance, and providing an alert system for local data collection device failures to send an alert to the Aquaculture Cloud Server to initiate a repair or replacement work order.

Any of the aquaculture cloud server methods herein may include wherein the aquaculture cloud server has programming to monitor data and device integrity, where tampering with a local data collection device or tampering with data transmission generates an alert for investigation and repair of the the local data collection device.

Any of the aquaculture cloud server methods herein may include wherein pond integrity is monitored using one or more additional sensors to detect for a toxic chemical, a metal, a biological contaminant, and a contaminant, and wherein the one or more additional sensors report to the Aquaculture Cloud Server, and wherein the aquaculture cloud server provides a report of food source integrity from farm to table, wherein such report provides a value-added feature for farmers and investors, and minimizes liability in the event of loss or injury.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal subparts. As will be understood by one skilled in the art, a range includes each individual member.

Fundamentals of Sonar.

Sonar systems work by transmitting a directionally concentrated acoustic pulse (signal) through the environment and then measuring the time it takes the reduced pulse (echo) to return. In operation, a transmitter generates an electrical pulse which is applied to a transducer. The transducer converts this pulse to a mechanical vibration which produces an oscillating pressure wave thus forming an acoustic pulse. This pulse traverses the environment and is scattered by objects different from that of the surrounding medium and some portion of the pulse is reflected back to the transducer as an echo. When the echo returns, the transducer is mechanically excited by the sound pressure and converts the vibration into an electrical signal which is then detected and amplified by the receiver. The received signal contains information about the ensonified objects (amplitude, distance, etc.) that can then be interpreted through data processing algorithms.

Using Sonar to Detect and Characterize Targets.

As previously stated, the received signal contains information that can be extrapolated for the detection and characterization of targets in an aquatic environment. When the acoustic wave hits the edge of a target, a portion of the signal is reflected away, returning an echo of reduced energy. Where the target slopes, medium echoes are received. A hard return will result if the target is positioned perpendicular to the beam and a shadow (no echo) will be present from an area directly behind, blocked from the acoustic wave. Combined, these data allow for the detection and characterization (size, shape, etc.) of targets given sufficient acoustic information (i.e. resolution).

The paradox of resolution in a sonar device. Resolution is a function of size, shape, and timing of the high-energy acoustic wave and its return echo in 4-dimensional space— the more precise the coupling between cause and effect (pulse and echo), the better the resolution. However, the resolution is inversely proportional to the area sampled; increased spatial precision is gained at the cost of reducing temporal precision. To circumvent this limitation, multibeam and scanning sonar systems have been developed to maintain resolution over an increased field of view to maximize data collection on a spatio-temporal scale.4 Multibeam sonar has several transducers that allow a large swath of area to be surveyed at simultaneously whereas scanning sonars use a single transduce to rapidly obtain multiple evenly-spaced cross-sections of the environment and then displaying the cross sections as a single image on a viewer.

Challenges of Implementing Sonar to Estimate Biomass in Shrimp Aquaculture Facilities.

Theoretically, any sonar device of sufficient resolving power could be implemented to detect shrimp on a farm. However, there is a level of complexity that cannot be ignored between detecting/characterizing a stationary lone individual in a uniform environment free of contaminating signals and a pond of free moving shrimp stocked at the highest tolerated density for a farmer to maximize the yield of their crop. In addition, there are a host of physical factors such as background noise, boundary conditions (surface, bottom, and other structures), aeration, water temperature, and turbidity that further contribute to the complexity of collection, analysis, and interpretation of sonar-based data.3, 5,6 Finally, any solution for estimating biomass needs to be cost-effective as current, if inaccurate, estimates are completed by hand. The degree of control/resolution within a sonar system is directly proportional to the precision of the instrument and ultimately its cost.

Prototype Deployment Established Proof-of-Concept.

Through one or more underwater sensors, a prototype demonstrated that shrimp could be detected with a sonar-based device. Software was developed to work with the required hardware to provide meaningful data (estimates of abundance, size, growth, and behavioral abnormalities) to the shrimp farmer.

Experimental Design

Using overpowered sonar devices to detect shrimp. The initial system/processes implemented the ARIS300 sonar-system owing to its impressive data collection capabilities, the fine degree of precision offered by extensive operator switches and control boards. The robust data collected with this overpowered system served as the basis for developing novel spatial/behavioral algorithms. These in turn could then also be applied to a cost-effective lower-resolution device.

Next, the system/processes also implemented using a SCAN-650, which is a high-performance scanning sonar system that is commercially available from JW Fishers (East Taunton, Mass.). The JW Fishers SCAN-650 is a scanning sonar that operates by transmitting a short, high energy, narrow-width acoustic wave and transforming the returned acoustic energy signals into digital images, correlated to signal intensity, which are assembled using a finite number of 2D pixels. The transducer head then rotates (steps) and the sequence is repeated; continuous stepping fills the display with the sonar image. The SCAN-650 has operating switches that allow for control of step sizes in half-degree increments between 0.5-2 degrees. The fan shaped beam and high spectral frequency (600 kHz) provides sufficient acoustic information to characterize targets within the beam (size, shape, distance, etc.). The amplitude of the returned signal is transformed into a colorimetric display of individual points filling one sector per "degrees step" until an image is formed over a predefined field of view.

FIG. 5 shows that a scanning sonar was sufficiently able to detect and resolve shrimp. Deploying the JW Fishers SCAN-650 sonar system showed that detection of shrimp could be achieved using a scanning sonar device (vs a multi-beam system such as the ARIS300). After briefly pausing the filtration, recirculation, and aeration systems, the system was sufficiently able to detect numerous structural elements as well as shrimp; typical data output from this system exemplified in FIG. 5.

For comparison, the ARIS300 device emits 128 beams at a 3 MHz maximum frequency and has a resolution threshold of ~1 cm while the SCAN-650 emits one rotating beam at a 600 Hz maximum frequency and a resolution threshold of ~2 cm. Granted, there is an order of magnitude difference between the two systems in terms of data robustness (as well as cost), but the observed differential of the return signal provided enough information to detect individual shrimp (<2 g) during the relevant part of their growout cycle. In addition, the operator switches and control boards on the SCAN-650 are robust enough that uniformity of the signal return can be obtained with the proper deployment and gain settings. Importantly, the differential of the return signal from shrimp (vs noise and background objects) provides enough information to filter the shrimp based on signal. This can be validated by observing the body shape and behavior (swimming) of the target object. This is why resolution is also important—to capture enough details for shrimp identification. In sum, the scanning sonar from JW Fishers provided the resolution required to accomplish real-time extrapolations of meaningful metrics such as biomass and behavioral changes.

In another preferred embodiment, the invention provides image analysis and statistical modeling allows for accurate estimation of biomass. The detection parameters of the system generated shrimp-specific algorithms from the data by controlling the size and concentration of animals present in a known area.

Shrimp were moved to a tank containing the system in the center, recording with full spatial coverage as individual shrimp of known size and weight were introduced to systematically vary animal density.

Data was recorded with the SCAN-650 which emits a frequency of 650 kHz and set to sweep the entire tank (360°) with a range of 5 m. Data were collected for 5 minutes (i.e. 300 sweeps) to ensure sufficient sample size and statistical power (80%; $\alpha<0.05$). Each sweep is a representation of the density and distribution of target objects (shrimp) across 600 seconds. Intensity maps or sonar images as seen in FIG. 5 above are produced from the density of target objects in the sample space. Shrimp information observed within a 3D space (water-column) are compressed into a 2D (top-down) intensity map.

Image analysis software integrated in the system can identify the locations of each individual shrimp within the designated sample space across the time-series. Using these locations, the system/processes parameterize the intensity and observe how this process changes over time. The invention may include assumptions of a uniform distribution within the tank and may also include tank assumptions having non-homogeneous features. Temporal behaviors (i.e. temporal autocorrelation) associated with intensity in time and be graphed to provide behavioral data. Mathematical models may be used to describe the temporal patterns in the dataset and forecast an anticipated count of shrimp in the tank considering both the size of the tank and spatial processes of the shrimp. Real-world data may be provided by a farmer in the form of average size/weight of ~60 shrimp for simple extrapolation of collected data to population metrics of the sampled area. The weight distribution of the shrimp may be manually sampled and extrapolated to the shrimp count to produce a biomass estimate of the population.

Experimental Summary

The invention also includes a system/processes able to collect sufficient shrimp-specific data using a single-beam scanning sonar system to provide aquaculture data, avoiding the requirement of a multibeam system. In the pursuit of developing a cost-effective solution for shrimp farmers to estimate their pond biomass, the cost-savings between the two fundamental components is highly beneficial to the end user. While these findings were helpful in providing guiding information for future development efforts, the translatability of findings is inherently limited as shrimp are not commercially cultivated under such controlled conditions. More complex experimental design under real-world conditions was necessary to refine novel shrimp-specific detection and population-level algorithms (biomass, behavior, etc.

Deployment and Refinement of System Under Real World Conditions

Armed with a basic understanding of the principals involved, the system/processes leveraged the results to refine data collection parameters and processing algorithms under real world cultivation conditions at the Kauai Shrimp production facility (Kekaha-Kauai, Hi.) shown in FIG. 7. Kauai Shrimp follows an "intensive-style" South East Asian cultivation model which is the primary market application of the product. Different "intensive" farming facilities can vary in scope (1 to over 100 ponds) but each individual pond possesses certain typical characteristics: pond size ranges from 0.1-0.5 ha, bottoms rapidly slope to a 3-4 ft uniform depth, large paddle wheels are employed as aeration systems, and drainage for waste is centrally located. Intensive ponds have a typical stocking density of 40-90 PLs/m2, with growout period of 90-120 days, and the entire crop harvested at the same time. A typical intensive pond may operate each pond for 3-4 cycles before they are then emptied, cleaned, and re-filled. With 40 individual ponds, ranging from ½ acre to 1 in size, and a stocking density of 40 shrimp/m2 these facilities are the ideal place to further the research.

In brief, the SCAN-650 system was deployed and sonar data collected from individual ponds (~50 m diameter; 0.25 acres) within 3 days of a pre-timed harvest (to maximize size of individual shrimp). Data collection parameters including: deployment location, spatial coverage, and signal gain were varied to establish the performance thresholds necessary for the development of a novel sonar-based biomass assessment system. As before, a mathematical model was used to describe the temporal patterns and forecast an anticipated estimate considering both the sample area and spatial processes of the shrimp.

As shown in FIGS. 7 and 8, the deployment location is critical for accurate prediction of population biomass. To achieve the most accurate population metrics possible (e.g. biomass), knowing "where" to sample is equally important as knowing "how" to sample. In the wild, marine invertebrates (and specifically *Litopenaeus vannamei*) are schooling organisms that exhibit zonation across environmental gradients to facilitate survival and reproduction. In a tank, shrimp are uniformly distributed within the system due to the lack of space, which limits "natural" behaviors. In aquaculture systems, much less is known about shrimp behavior and population distribution as the pond habitat creates environmental gradients but on the meso-scale (m). Systematic sampling is required to determine the shrimp population distribution across zones.

Kauai Shrimp, like most intensive style farms, operate circular shaped ponds that can be broken into three distinct zones: edge, middle, and toilet. The system/processes employed statistical modeling to ensure that the system/ processes were capturing sufficient and meaningful data for the initial development of the algorithms; (FIG. 8C) describes various population models and their respective biomass estimates calculated from each zone:

The Proportional Model assumes shrimp are uniformly distributed throughout the entire pond, observed densities correlate to the relative portion of the total pond area/ population, and sampling could be supported from any zone as a simple extrapolation of the sample data yields high accuracy biomass estimates. In reality shrimp are non-homogeneously distributed and the toilet zone is anecdotally observed to have the highest density possibly due to the mild drainage current.

The Non-homogenous Model assumes a non-homogeneous distribution between regions associated with anecdotal observations from the personnel at Kauai Shrimp; under and over estimation yields low accuracy from any zone that is not the intermediate zone.

The Spatially Justified Model assumes a maximum stocking density of 150 shrimp/m2 in both the edge and the toilet with the remainder in the intermediate zone; under and over estimation yields low accuracy from any zone that is not the intermediate zone. In reality, shrimp would not be stocked at this density due to the high mortality associated with overcrowding (aggression) and poor water quality.

Operating from a priori assumptions, the system/processes justify the data collection from the intermediate zone to maximize the accuracy of the initially developed algorithms. It is worth noting however, that while sampling from the intermediate zone provides the highest level of accuracy (55-99%), sampling from the intermediate zone in isolation may not provide sufficient data to the farmer. This highlights the importance of capturing meso-scale behavioral patterns of shrimp as they manifest along zones or gradients of aquaculture ponds.

As shown in FIG. 8, the density differences between the three regions (edge, middle, toilet) are characterized to not only improve the accuracy of the shrimp specific algorithms and biomass estimates but also ensure that the system/ processes are providing sufficient and meaningful data to the farmer.

As shown in FIGS. 9 and 10, meaningful data collection is a balance of spatial coverage and resolution. Both the distance (range) and width of the sonar beam (field-of-view) define the overall 3D space that is ultimately observed by the device (spatial coverage). While it may seem advantageous to cover as much space as possible to maximize the data collected and fully observe a distributed population, there is an inverse relationship between spatial coverage and resolution which subsequently impacts the ability of a system to collect sufficient and meaningful data. If the Sample Area is too small, the system/processes fail to collect enough information and reduce confidence in the calculations due to the lack of statistical power that validates the assumptions. If the Sample Area is too large, the system/processes risk artificially inflating small (non-significant) effects into statistically significant differences. Optimization of these two parameters guides the rational development of a shrimp-specific product by informing the minimum performance thresholds by which a novel device must adhere.

As mentioned previously, the SCAN-650 scanning sonar device transforms acoustic energy signals into digital images, correlated to signal intensity, which are assembled using a finite number of 2D pixels. Under these circumstances, image resolution can be conceptualized as the amount of information contained within a fixed plane; i.e. the number of pixels used to represent a given area (pixels per inch; ppi). As the spatial coverage increases, the increased volume of data that must be represented by the same number of pixels becomes compressed and decreases the resolution/ppi. In addition, the spatial coverage is directionally proportional to the amount of time required to sample the entirety of the defined area; the larger the coverage, the more time required to sample. Furthermore, spatial coverage is also directionally proportional to the computational demand required for processing raw information into meaningful data. Development of a cost-effective unit requires the minimization of computational burden wherever possible to reduce the need for more expensive processing components. In sum, the balance between spatial coverage and resolution impacts the ability of an observer to confidently define individuals and extrapolate population metrics; both the range and field-of-view need to optimized for the collection of meaningful data for the estimation of shrimp using a sonar device.

To assess the impact of range and field-of-view on data collection, the system/processes systematically varied spatial coverage from 5 to 40 m range (with a 360° field-of-view) and field-of-view from 45-360° (with a 5 m range) on various metrics; results are summarized by the above tables. In brief, a 5 m range was selected as the optimized setting because it provides maximum resolution (ppi) of the ranges investigated. As fully grown shrimp are mere inches in length, high-resolution sampling is required to capture their patterns at a such fine-scale. A scan angle of 60° was determined to be the optimized setting because it provides the FOV/sample area (m2) necessary to achieve sufficient spatial coverage/data collection for estimation of population-level metrics (e.g. biomass). Taken together these results inform the minimum specifications on the construction of a cost-effective device specifically designed to assess shrimp in aquaculture settings.

Figure 13:
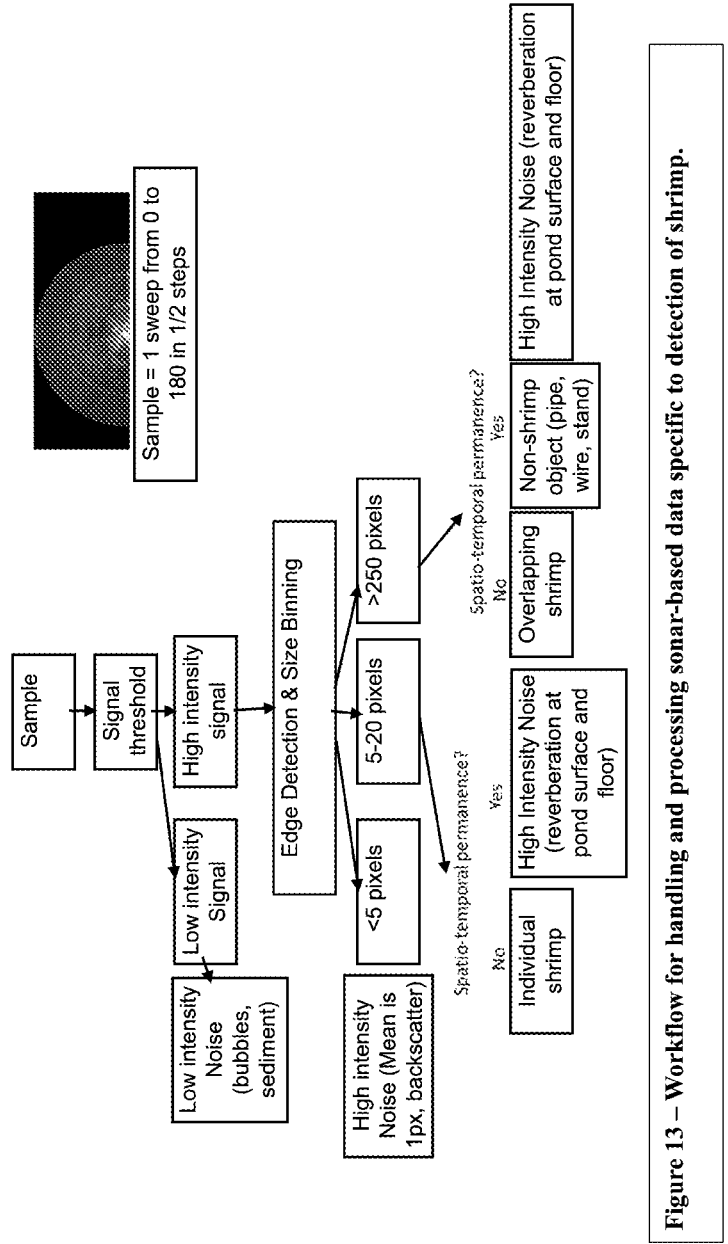
FIG. 13 is a flowchart of a workflow.
Figure 15:
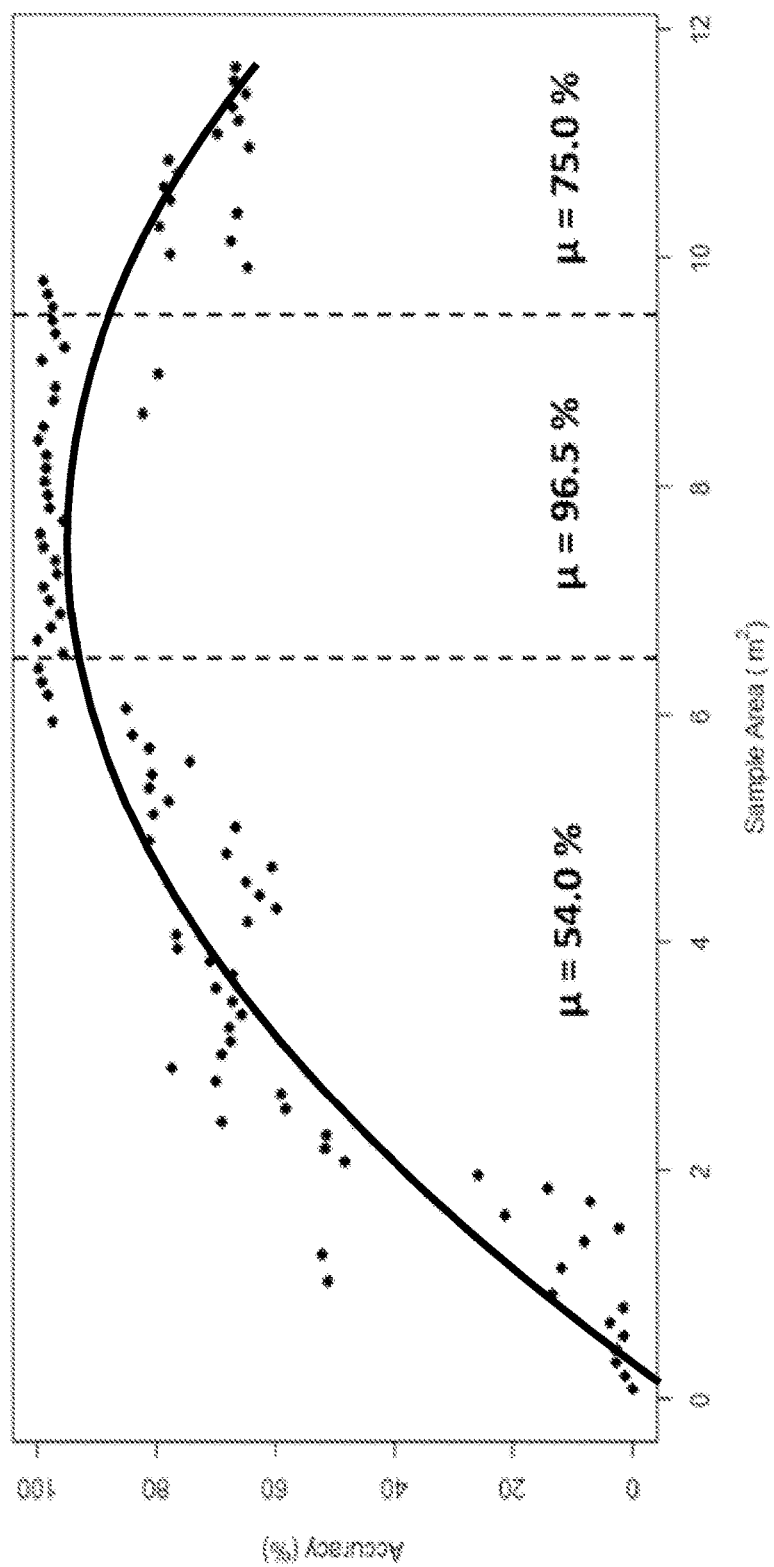
FIG. 15 is a line graph of accuracy against sample area.
Figure 16:
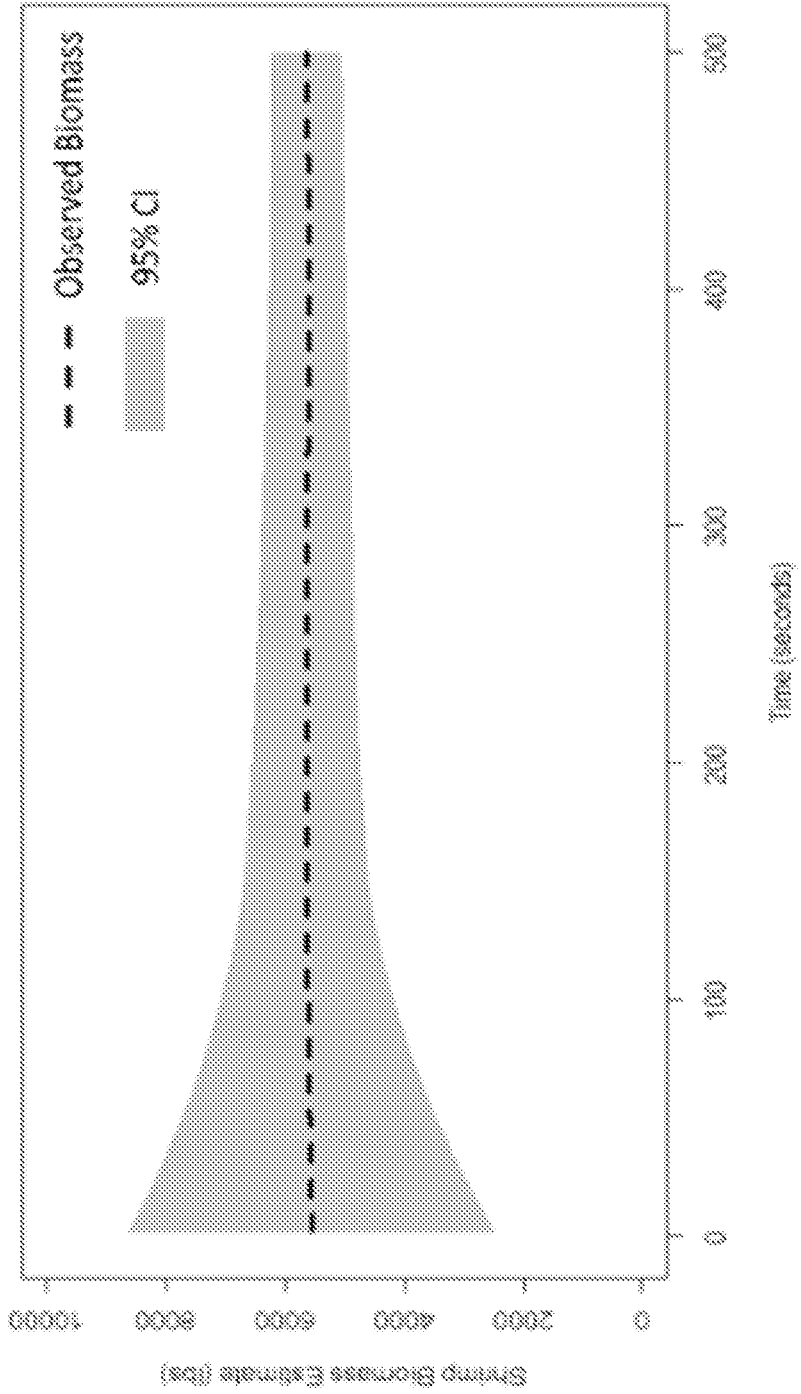
FIG. 16 is a graph of biomass estimate against time.

In another preferred embodiment, the invention provides specific data collection refinements to improve system accuracy for field operations. As shown in FIG. 13, the system in one embodiment may use a suspended deployment of the sonar device to improve efficiency of spatial coverage and reduce background reverberation. Through practical application, the system/processes have come to appreciate the deployment of the sonar device with regards to achieving efficient spatial coverage. Specifically, vertical deployment of the sonar head allows for the observation of the entire water column (surface to bottom) by taking acoustic cross-sections throughout the pond. Under near-field conditions (before full resolution of the water column) spatial coverage is greatly reduced which corresponds to increased background noise and the overestimation of individual shrimp. Conversely, full-field conditions capture the entire water column establishing clear upper and lower bounds of the sample area and possesses ~3× the area of spatial coverage under the same vertical deployment conditions; improving signal:noise ratio and population metrics. Importantly, there is also a known "dead-zone" (region of high signal interference) due to the misattribution of emitted pings as received pings by the transducer. This is the result of the spatiotemporal proximity and the overlap between the outbound and inbound signals at the initiation of the scan angle. It is worth nothing the proportion of near-field vs far-field coverage as well as the extent of the signal "dead zone" is a function of water column depth and the position of the sonar device within it. The system/processes have found that suspending the device in the middle of the column (~0.7 m in a 1.5 m deep pond) achieves full-field conditions more readily as well as minimizing the extent of the "dead zone" to ~3.3 m from the transducer. The results indicate that an optimized sample range from 3.3-5 m with a 90° scan-angle (wedge), a region where the system/processes can capture the entire-water column, filter out near-field noise, and collect data with the highest resolution/least computational demand.

Optimization of gain and threshold settings improves data processing. "Gain" represents the relationship between the raw analogue input and the digital output signals as modified by operational amplifiers; increasing the gain amplifies the output signal by increasing the ratio of digitized intensity units assigned per unit of input energy collected on the receiver. "Threshold" is a preprocessing step that occurs prior to the display of the output signal whereby an mathematical offset is applied to the data to remove the portion of the return signal that has a high probability of arising from non-specific/interfering signal sources (bottom returns, random noise generated within the receiving circuitry, etc.). In the case of a sonar device, the acoustic energy collected by the sensor (analogue input) becomes transformed into pixel intensity (digital output) as a function of the signal gain and is then preprocessed by the device as a relative to a threshold value prior to its display as a given pixel intensity relative to the spatiotemporal properties of an acoustic return signal.

With respect to gain, this signal amplification is necessary in order to compensate for the loss of acoustic energy as it traverses the distance from the transmitter to the object and back to the receiver (inverse-square law). Gain is also dependent on the need to collect data from within a dynamic range—balanced between undetectable and saturated signals. If the gain is too low, meaningful data can be lost when the information contained within the signal is misconstrued as background (undetectable). Conversely, if the gain is too high, meaningful data can be lost when the information contained within the signal surpasses the maximum detection limits (saturated). Additionally, since the detection parameters are biased towards the presence of signal rather than its absence, a high gain conveys information attributable to imperfect systems (noise) rather than signal which limits the ability to differentiate between the presence and absence of meaningful data (signal:noise ratio).

With respect to threshold, the conditions for defining an "appropriate signal threshold" are not standardized but are the result of the theoretical performance limit predetermined by the device manufacturer coupled with the conditions of its use. The theoretical performance limit defined by the manufacturer arises as a result of when a signal becomes indistinguishable from background noise due to various losses (e.g. transmitter/receiver imperfections, undesirable wave propagation, and external noise sources) under highly controlled/isolated conditions. The use conditions of the device add an additional layer of background noise such that a user defined value is required to determine point at which meaningful signal is distinguishable from irrelevant signal. In a manner similar to gain, thresholding of data is necessary to maximize signal:noise across a dynamic range but it is subject to the same limitations and loss of relevant information due to over/under-thresholding of the signal.

In any system, signal gain and threshold need to be adjusted depending on the sampling conditions. Gain/threshold must be adjusted to ensure sufficient data is collected (positive bias) serving as a visual cue for the researcher. Paradoxically, in the system, this unwillingness to "miss" potentially meaningful data tends to result in less-accurate estimations of population metrics as the subsequent increase in background noise interferes with its calculation (FIG. 12).

Location Summary

The invention includes sampling locations from one or more zones of an aquaculture facility. Zones within the scope of the invention includes. Statistical modeling of sampling location may reveal variations in representative data collected from the various zone of the pond. The balance between spatial coverage and resolution necessary for observing both individual shrimp and population-level metrics is achieved by coupling an optimized range over an optimized field of view. For example, the invention contemplates ranges from 3-50 m and field-of-view from 30-270° In a preferred embodiment, the range may be 5-30 m and FOV may be 30-90°. Data collection was further refined for real-world deployment by suspending the sonar device within the water column as well as adjusting gain and threshold to maximize signal:noise ratio.

In another preferred embodiment, the invention provides establishment of standard data collection workflow for shrimp identification. One of the most important factors in developing a system to quantify the population biomass of shrimp production facilities is the ability to determine what IS vs what IS NOT a shrimp. Optimization of the data collection procedure (Aims 1-2) along with preliminary signal processing and image processing techniques combine to enable the differentiation of acoustic signal originating from targets (shrimp) as compared to other objects (not shrimp) or background noise present in the system. A standardized workflow is detailed in FIG. 13.

In one preferred embodiment, returning echoes may be collected by the transducer, converted from analogue to digital, and the resulting signal is thresholded before being segregated based on intensity strength. Intensity strength is imaged as the RGB (R, G, B) color scale by the manufacture's software (JW Fishers). The system/processes standardized the color values at Red (255,0,0), from 0 to 510. Low intensity returns (<100) are an artifact of particulate matter in the water column as well as air bubbles. High intensity (>100) signals may be processed for edge detection before returns within the bounds of the defined area (pixels2) are enumerated. Size binning may then be used to distinguish objects too small to be a shrimp (i.e. high-intensity noise; <5 pixels) and the remaining high-intensity objects may be binned according to size: 5-250 px and >250 px. Regions of interest from 5-250 px that do not exhibit spatial-temporal permanence may be categorized as individual shrimp while regions greater than 250 px that are moving around may be categorized as a cluster of shrimp. Each cluster may further be distilled into individuals by simulating a Geyer's point process within the bounding box of the cluster. The location of individual shrimp may serve as the basis for the calculation of population biomass.

In another preferred embodiment, the invention provides initial estimations of biomass were comparable to manual sampling techniques. Understanding shrimp population metrics (count, size, etc.) is the first step in understanding the overall biomass present in a pond. In theory, the most accurate way to determine population biomass is to observe every individual and combine those observations into population-level metrics; in practice, this approach is not always feasible or realistic. As such, the system/processes must rely on sampling techniques and extrapolation of observations in order to make assumptions about the population as a whole. However, the system/processes must take care to sample and collect data in a way to limit the introduction of error wherever possible. A statistically robust sampling procedure improves the chances of accurately capturing population-level metrics without the need for assessing every individual.

Shrimp farmers are currently making daily decisions that impact the entire supply chain based on inaccurate data from archaic sampling methods. The current gold standard relies on the use of cast nets—a low-tech, low-cost, but labor-intensive process by which shrimp (~20-60/sample) are removed from the pond using small nets and are manually assessed for size and weight. Population biomass is then estimated based on the size/weight distribution of the collected shrimp as a function of the number of PLs present at time of stocking and the number of days of growout culture. Typically, multiple samples are obtained from multiple locations within the pond and this occurs on a daily basis, yet accuracy using this technique is accepted as providing ~50-85% accurate estimations as both under- and over-estimation are equally as likely.

Leveraging the results, the system/processes deployed the sonar device in the pond's intermediate zone (suspended in the water column) and collected data over 5 m range, 60° scan angle, at an appropriate gain for 5 minutes (i.e. 300 sweeps). High resolution spatiotemporal images output from SCAN-650 device were analyzed using ImageJ software to calculate the population density of the sampled area by manually defining/counting "shrimp" on each image of the dataset. A simple extrapolation from the population density over the sample area was converted to total population using the following equation:

$$(TPA*N)/SA=\text{Total Count}$$

N=individual shrimp count
SA=Sample Area (m2) of a privileged subsection of the data window
TPA=Total Pond Area (m2)
Total Count=extrapolated count of individuals The conversion of extrapolated Total Count to Estimated Biomass requires the size/weight distribution of shrimp to estimate biomass of the entire pond. This is obtained by manual sampling and is a standard part of a farmer/farm managers workflow. Calculation occurs using the following equation:

$$\text{Total Count}*\text{WeightObserved}=\text{Est. Biomass}$$

Total Count=extrapolated count of individuals
WeightObserved=weight distribution of ~60 shrimp (provided by manual sampling)
Est. Biomass=estimated biomass of the pond Using the above parameters, the system/processes were initially able to achieve estimates of shrimp biomass between 56-80% and an average accuracy of 70.1% (FIG. 14). It is worth noting, that this level of accuracy is on par with manual sampling and estimation of shrimp biomass. This underscores the need for additional data and highlights the inherent limitations of manual sampling. Specifically, it brings to the forefront the inability of manual sampling to observe an organism in situ over an extended period of time. As the sonar-based system is a non-invasive surveillance technique, the system/processes are able to refine the data sampling and processing parameters to improve the accuracy of the system and achieve the performance required of a commercially viable product.

In another preferred embodiment, the invention provides for correcting for likely sources of error in data processing parameters. As mentioned previously, spatial coverage is directionally proportional to the amount of time required to sample the entirety of the defined area; the larger the coverage, the more time required to sample. This is particularly meaningful in a system where individuals (i.e. shrimp) are not static objects but dynamic organisms that move in- and out-of-frame and are at risk of artificially skewing population metrics. Unfortunately, geo-referenced data is subject to latent spatial autocorrelation and standard statistical approaches assume that measured outcomes are independent; that a shrimp once counted, will not be counted again. Optimizing the effective sample size is necessary to capture the dependence in the dataset and will lead to a better understanding of the contribution of autocorrelation present within the system. To improve the accuracy of the analysis, differences in the estimated (calculated) and observed biomass (harvested) were used to refine the underlying biomass estimation algorithms to better reflect the observed/real-world data.

Data Corrections as a Function of Sample Area.

Mathematical modeling may be used to take into account "seasonality" data (in the case shrimp behavior) that contribute to non-stationarity. Using modeling parameters, the system/processes may observe relationships between Sample Area and biomass estimation accuracy, which can be used to optimize sample area with biomass.

Data Corrections as a Function of Time.

As cultured shrimp are distributed within both space and time, information on shrimp locations within the sample space lends itself to point-pattern analyses. As such, Nearest Neighbor (the distance between two shrimp) and a spatial modeling can be leveraged to refine meaningful data as a function of sample time.

Real-world data may be used to adjust the distribution parameters, to identify the most robust model. The resulting distribution parameters enable simulations of similar densities and distributions for the entire pond per unit time (e.g. t1:N=110,000 shrimp; t2:tn+1:N=107,000 shrimp; etc.). A time-series of shrimp counts (t1-300) may be used to describe population density as a function of both space/time and modeled.

Forecast data from the model is then used to obtain a "truer" signal while accounting for fluctuations caused the dynamic nature of the shrimp.

In another preferred embodiment, the invention provides refined estimations of biomass far surpassing manual sampling techniques. Datasets may be re-analyzed using subsampling of the total Sample Area(s) to ensure the defined region had maximum accuracy. Total CountRefined was then obtained from modeled shrimp densities within these regions forecast over a 300-sweep time-series of shrimp counts. With a known weight distribution, the system/processes can estimate population biomass using the corrected Total CountRefined and achieve an improved estimate of population biomass ($\bar{x}$=96.8%; range=88-99%).

Total CountRefined*WeightObserved=Est. Biomass-Refined

Total CountRefined=extrapolated count of individuals

WeightObserved=weight distribution of ~60 shrimp (provided by manual sampling)

Est. BiomassRefined=Refined estimated biomass of the pond

Data Collection Summary

By standardizing data collection, the system/processes are able to discern signals from shrimp and non-shrimp sources within a defined region. Calculation of shrimp population density within this region enabled simple extrapolation of total shrimp biomass ($\bar{x}$=70.1%; range=56-80%). Refinement of population-level metrics was achieved by addressing spatiotemporal autocorrelation via area subsampling and time-series. Taking the above factors into consideration, the system/processes apply these corrections to refine the calculations of population biomass obtained from the scanning sonar and achieve estimates of population biomass that is far more accurate ($\hat{x}$=96.8%; range=88-99%) than one that does not consider contributions of spatial or temporal variables.

Web Portal and Cloud Server

As shown in FIGS. 18-29, in a non-limiting preferred embodiment, the aquaculture data is transmitted by cellular or satellite communication to a cloud server. The data can be further processed using server-side models and simulations to refine and improve the data. Shrimp behavior data can be uploaded and analysis and monitoring of a single pond, an entire farm of ponds, or an entire region of farms of ponds is performed. This refined data can be used to provide production data to farmers regarding feed administration, harvest timing, and so forth. Farm-specific production data can be provided to feed suppliers to improve supply chain and manage capital and labor expenses for the farmer.

As shown in FIGS. 19-20, forecasting data can be generated using a time series plot of refined data. Forecasting data can be used by farmers to optimize market pricing, and such data can be sold to futures traders, buyers, shrimp processors, feed companies, farm investors, and farm insurers.

As shown in FIG. 21, investors and insurers could use such data to generate best farming practices and could offer best practices to the farmers and processors to maximize profits and minimize losses.

As shown in FIG. 22, an Aquaculture Cloud Server may be housed in a data center and may use a database, relational database, or distributed storage facility. The invention may use encryption such as AES 256 or similar to protect communications and storage. The invention may use blockchain technology to track identity and authentication information. The Cloud Server may also be programmed to generate reports for subscribers. Subscription based payment systems may be integrated with the Aquaculture Cloud Server.

As shown in FIGS. 23-25, data collection devices may include a smart phone in communication with a sonar device, or may be a dedicated mobile device. Data collection using a local computer, like any handheld devices, would be able to transmit and receive data from the sonar device using available bandwidth, including Bluetooth, UHF and/or VHF radio, cellular frequencies, satellite frequencies, and may also use a wired connection.

Data analysis can be provided within the programming of the hand-held or other collection devices. Data analysis can also be passed on to the Aquaculture Cloud Server where the local device is merely used as a repeater to collect the sonar data and transmit it to the Cloud Server. Having analysis and programming at the Cloud Server would provide data security and data integrity. Local devices may be authenticated using hardware serial number or device serial numbers such as IMEI numbers. Dedicated IOT devices may be mounted directly to the sonar data device to automate data collection and to further maintain data integrity and programming optimization.

As shown in FIG. 26, GPS or geolocation services may be used for the data collection devices, the sonar devices, or the combined IOT sonar data collection and transmission devices.

As shown in FIG. 27, diagnostic programming for the local devices, sonar and handheld or local, may be used to monitor the health and functioning of the farm-based devices. Sonar devices could be subject to periodic maintenance according to a duty schedule and device failures may send an alert to the Cloud Server to initiate a repair or replacement work order.

As shown in FIG. 28, data and device integrity may be monitored using the Cloud Server where tampering with a device or tampering with data would generate an alert so that the local device could be investigated and re-booted, replaced, or corrected.

As shown in FIG. 29, pond integrity may also be monitored using additional sensors. Toxic chemicals, metals, biologics, contaminants, and so forth may be remotely monitored and reported to the Cloud Server. Providing reports of food source integrity from farm to table provides a value-added feature for farmers and investors, and minimizes liability in the event of loss or injury.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

Having described embodiments for the invention herein, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

The invention claimed is:

1. A method for obtaining aquaculture data in an aquaculture facility, comprising:
    transmitting a series of acoustic pulses with a transducer through the aquaculture facility, wherein the series of acoustic pulses is transmitted over time period t and is transmitted at a scan angle of 15-360°, wherein the aquaculture farming facility has a size of 0.25-100 hectares (ha), wherein the transducer is a scanning transducer and transmits the series of acoustic pulses in cross-sections, wherein the range of the series of acoustic pulses is from 1-50 m;
    detecting a series of scattered return signals with an underwater sonar receiver, wherein the scattered return signal is detected over the time period t;
    comparing the series of acoustic pulses and the series of scattered return signals and calculating a series of signal difference data points;
    transmitting the series of signal difference data points by cellular or satellite communication to a cloud server, wherein the series of signal difference data points is processed using a server-side model and/or simulations to generate aquaculture data, wherein the aquaculture data is selected from shrimp biomass, shrimp distribution, shrimp abundance, shrimp size, shrimp growth, shrimp survival, shrimp mortality, shrimp behavior, and shrimp location, wherein the shrimp biomass has >90% accuracy compared to manual biomass weighing method, wherein the aquaculture data includes the series of signal difference data points transmitted from a single pond, an entire farm of ponds, or an entire region of farms of ponds;
    sending aquaculture data to one or more subscribers selected from a farmer, a feed supplier, a farm investor, a farm insurer, a shrimp buyer, and a pond monitor, wherein the aquaculture data is used to generate shrimp feed administration data, harvest timing data, feed supplier supply chain data, and/or capital and labor expense data.

2. The method of claim 1, wherein forecasting data is generated using a time series plot of aquaculture data, wherein forecasting data includes market pricing data, wherein the forecasting data is delivered by subscription to subscribers selected from a futures trader, a buyer, a shrimp processor, a feed company, a farm investor, and a farm insurer.

3. The method of claim 1, comprising the step of generating a list of best farming practices from aquaculture data, wherein the list of best farming practices is delivered by subscription to subscribers selected from a farmer, an investor, and an insurer.

4. The method of claim 1,
    wherein the aquaculture cloud server is in communication with a local data collection device comprising a smart phone or dedicated mobile device or a local computer, the local data collection device in communication with the underwater sonar receiver, and wherein the local data collection device transmits and receives data from the underwater sonar receiver using Bluetooth, UHF and/or VHF radio, cellular frequencies, satellite frequencies, or a wired connection, and
    wherein the Aquaculture Cloud Server is housed in a data center and uses a database, relational database, or distributed storage facility, and wherein the aquaculture cloud server includes an encrypted communications protocol to protect communications and storage, and wherein the aquaculture cloud server includes blockchain technology to track identity and authentication information, and wherein aquaculture cloud server includes program instructions to generate reports for subscribers, and wherein the aquaculture cloud server includes a subscription based payment system integrated with the aquaculture cloud server.

5. The method of claim 1, wherein the series of signal difference data points is converted to aquaculture data at the aquaculture cloud server, wherein a local data collection device is a repeater or is mounted directly on the underwater sonar receiver and transmits the series of signal difference data points to the aquaculture cloud server, and wherein the aquaculture cloud server has a security module for data security and data integrity, to authenticate the local data collection device using a hardware serial number or device serial number.

6. The method of claim 4, wherein the local data collection device collects and transmits GPS or geolocation to the aquaculture cloud server.

7. The method of claim 4,
    wherein the aquaculture cloud server has diagnostic programming to monitor the health and functioning of the local data collection device, and wherein the programming includes providing a duty schedule for the underwater sonar receiver for periodic maintenance, and providing an alert system for local data collection device failures to send an alert to the Aquaculture Cloud Server to initiate a repair or replacement work order,
    wherein the aquaculture cloud server has programming to monitor data and device integrity, where tampering with a local data collection device or tampering with data transmission generates an alert for investigation and repair of the local data collection device.

8. The method of claim 1, wherein pond integrity is monitored using one or more additional sensors to detect for a toxic chemical, a metal, a biological contaminant, and a contaminant, and wherein the one or more additional sensors report to the Aquaculture Cloud Server, and wherein the aquaculture cloud server provides a report of food source integrity from farm to table, wherein such report provides a value-added feature for farmers and investors, and minimizes liability in the event of loss or injury.

9. The method of claim 1, wherein the transducer comprises a multibeam system having multiple transducers, each of said multiple transducers transmitting multiplexed acoustic pulses simultaneously, and wherein the networked underwater sonar receivers in said multibeam system configured to receive said multiplexed acoustic pulses.

10. A method for measuring aquaculture data in an aquaculture facility, comprising:
    transmitting an acoustic pulse with one or more transducers through the aquaculture facility;

detecting a scattered return signal with one or more underwater sonar receivers;

comparing a signal difference between the acoustic pulse and the scattered return signal and inputting said signal difference into a computer having a processor and memory, said memory having computer program instructions saved thereon and executable on the processor, said program instructions configured to receive the signal difference and calculate a signal difference data point related to a calculated shrimp biomass and distribution in the aquaculture farming tank or pond;

outputting to a display the signal difference data point related to the calculated shrimp biomass and distribution.

11. The process of claim 10,
wherein the acoustic pulse is transmitted over a period of time t,
wherein the scattered return signal is detected over the period of time t,
wherein the signal difference is inputted over the period of time t,
wherein the signal difference over time period t is saved to memory as a series of signal difference data points,
wherein each of the series of signal difference data points are related to the calculated shrimp biomass and distribution; and
wherein the series of signal data points are output to the display
  wherein the transducer is a scanning transducer and transmits acoustic pulses in a series of cross-sections,
  wherein the display comprises an intensity map having pixel color intensity correlate to strength of the scattered return signal, and wherein a structural element in said aquaculture farming tank or pond is represented differently than shrimp, said structural element selected from an air pipe, a center standpipe, or a tank edge,
  wherein the aquaculture farming facility has a size range selected from the group consisting of 0.25 hectares (ha), 0.5 ha, 0.25-1.0 ha, 1 ha, 0.5-3.0 ha, 1.0-3.0 ha, >3.0 ha, 3.0-20 ha, 20-100 ha,
  wherein the aquaculture facility has a diameter range or having a length in at least one dimension selected from the group consisting of 3 meters, 5 meters, 3-10 meters, 5-20 meters, 10-30 meters, 20-40 meters, less than 50 meters, 40-80 meters, 40-100 meters, 100 meters, and >100 meters,
  wherein the acoustic pulse is transmitted at a scan angle range selected from 15-360°, 15-60°, 30-90°, 45°, 30-180°, 60-270°, 45-360°, 180°, and 270°,
  wherein the scan range is selected from the group consisting of: 5-10 m, 5-20 m, 5-40 m, 5-50 m, 5-250 m, 20-100 m, 20-250 m, and >50 m,
  wherein the process achieves a 90-99% accurate estimation of biomass.

12. The process of claim 10, wherein the transducer comprises a multibeam system having multiple transducers, each of said multiple transducers transmitting multiplexed acoustic pulses simultaneously, and wherein the networked underwater sonar receivers in said multibeam system configured to receive said multiplexed acoustic pulses.

13. The process of claim 10, wherein the signal difference data point is selected from the group consisting of a shrimp abundance data point, a shrimp size data point, a shrimp growth data point, a shrimp survival data point, a shrimp mortality data point, a shrimp behavior data point, and a location within the aquaculture facility farming container data point.

14. The process of claim 10, wherein the acoustic pulse is transmitted at a scan angle of 0-360° and a range from 0-40 m.

15. The process of claim 10, wherein the process achieves at least 90% accurate estimation of biomass.

16. A system comprising:
a acoustic pulse transducer configured to transmit a acoustic pulse into an aquaculture farming tank or pond,
a network of underwater sonar signal receivers;
a computer connected to the network of underwater sonar signal receivers, said computer having a processor and memory, said memory having computer programming instructions saved thereon and executable on the processor, said computer programming instructions configured for receiving and comparing a signal difference between the acoustic pulse and the scattered return signal and for using the signal difference to output a signal difference data point related to a calculated shrimp biomass and distribution in the aquaculture farming tank or pond;
a computer display connected to the computer and configured to display the signal difference data point related the calculated shrimp biomass and distribution.

17. The system of claim 16,
wherein the acoustic pulse is transmitted over a period of time t,
wherein the scattered return signal is detected over the period of time t,
wherein the signal difference is inputted over the period of time t,
wherein the signal difference over time period t is saved to memory as a series of signal difference data points,
wherein each of the series of signal difference data points are related to the calculated shrimp biomass and distribution; and
wherein the series of signal data points are output to the display,
  wherein the transducer is a scanning transducer and transmits acoustic pulses in a series of cross-sections,
  wherein the display comprises an intensity map having pixel color intensity correlate to strength of the scattered return signal, and wherein a structural element in said aquaculture farming tank or pond is represented differently than shrimp, said structural element selected from an air pipe, a center standpipe, or a tank edge,
  wherein the aquaculture farming facility has a size range selected from the group consisting of 0.25 hectares (ha), 0.5 ha, 0.25-1.0 ha, 1 ha, 0.5-3.0 ha, 1.0-3.0 ha, >3.0 ha, 3.0-20 ha, 20-100 ha,
  wherein the aquaculture facility has a diameter range or having a length in at least one dimension selected from the group consisting of 3 meters, 5 meters, 3-10 meters, 5-20 meters, 10-30 meters, 20-40 meters, less than 50 meters, 40-80 meters, 40-100 meters, 100 meters, and >100 meters,
  wherein the acoustic pulse is transmitted at a scan angle range selected from 15-360°, 15-60°, 30-90°, 45°, 30-180°, 60-270°, 45-360°, 180°, and 270°,
  wherein the scan range is selected from the group consisting of: 5-10 m, 5-20 m, 5-40 m, 5-50 m, 5-250 m, 20-100 m, 20-250 m, and >50 m, wherein the process achieves a 90-99% accurate estimation of biomass.

18. The system of claim 16, wherein the transducer comprises a multibeam system having multiple transducers, each of said multiple transducers transmitting multiplexed acoustic pulses simultaneously, and wherein the networked underwater sonar receivers in said multibeam system configured to receive said multiplexed acoustic pulses.

19. The system of claim 16, wherein the series of signal difference data points is selected from shrimp abundance, shrimp size, shrimp growth, shrimp survival, shrimp mortality, shrimp behavior, and shrimp location within the aquaculture facility.

20. The system of claim 16, wherein the acoustic pulse is transmitted at a scan angle of 10-180° and a range from 5-40 m.

21. The system of claim 16, wherein the acoustic pulse is transmitted at a scan angle of 45-360° and a range from 5-40 m.

22. The system of claim 16, wherein the acoustic pulse is transmitted as a continuous scan at an 360° and a range from 5-40 m.

23. A method of using an aquaculture cloud server for aquaculture farming, comprising:
    transmitting a series of signal difference data points generated by comparing a series of transmitted acoustic pulses to a series of scattered received signals in an aquaculture pond, said transmitting by cellular or satellite communication to a cloud server,
    wherein the series of signal difference data points is processed using a server-side model and/or simulations to generate aquaculture data,
    wherein the series of signal difference data points includes shrimp behavior data transmitted from a single pond, an entire farm of ponds, or an entire region of farms of ponds,
    wherein the aquaculture data includes >90% accurate biomass data compared to manual biomass measurement;
    sending the aquaculture data to one or more subscribers selected from a farmer, a feed supplier, a farm investor, a farm insurer, a shrimp buyer, and a pond monitor, wherein the aquaculture data is used to generate shrimp feed administration data, harvest timing data, feed supplier supply chain data, and/or capital and labor expense data.

24. The method of claim 23,
    wherein the Aquaculture Cloud Server is housed in a data center and uses a database, relational database, or distributed storage facility, and
    wherein the aquaculture cloud server includes an encrypted communications protocol to protect communications and storage, and
    wherein the aquaculture cloud server includes blockchain technology to track identity and authentication information, and
    wherein aquaculture cloud server includes program instructions to generate reports for subscribers, and
    wherein the aquaculture cloud server includes a subscription based payment system integrated with the aquaculture cloud server,
    wherein forecasting data is generated using a time series plot of aquaculture data,
    wherein forecasting data includes market pricing data,
    wherein the forecasting data is delivered by subscription to subscribers selected from a futures trader, a buyer, a shrimp processor, a feed company, a farm investor, and a farm insurer, and
    comprising the step of generating a list of best farming practices from aquaculture data, wherein the list of best farming practices is delivered by subscription to subscribers selected from a farmer, an investor, and an insurer, and
    wherein the aquaculture cloud server is in communication with a local data collection device comprising a smart phone or dedicated mobile device or a local computer, the local data collection device in communication with a sonar device operating in an aquaculture pond, and wherein the data collection device transmits and receives data from the sonar device using Bluetooth, UHF and/or VHF radio, cellular frequencies, satellite frequencies, or a wired connection.

25. The method of claim 23,
    wherein the series of signal difference data points is converted to aquaculture data at the aquaculture cloud server,
    wherein a local data collection device is a repeater to transmit aquaculture data to the aquaculture cloud server or a local data collection device is mounted directly on the sonar device and transmits aquaculture data directly to the aquaculture cloud server, and wherein the aquaculture cloud server has a security module for data security and data integrity, to authenticate a local data collection device using a hardware serial number or device serial number,
    wherein the local data collection device collects and transmits GPS or geolocation to the aquaculture cloud server,
    wherein the aquaculture cloud server has diagnostic programming to monitor the health and functioning of the local data collection device, and wherein the programming includes providing a duty schedule for the sonar device for periodic maintenance, and providing an alert system for local data collection device failures to send an alert to the Aquaculture Cloud Server to initiate a repair or replacement work order,
    wherein the aquaculture cloud server has programming to monitor data and device integrity, where tampering with a local data collection device or tampering with data transmission generates an alert for investigation and repair of the local data collection device, and
    wherein pond integrity is monitored using one or more additional sensors to detect for a toxic chemical, a metal, a biological contaminant, and a contaminant, and wherein the one or more additional sensors report to the Aquaculture Cloud Server, and wherein the aquaculture cloud server provides a report of food source integrity from farm to table, wherein such report provides a value-added feature for farmers and investors, and minimizes liability in the event of loss or injury.

* * * * *